(12) United States Patent  
Chase

(10) Patent No.: US 11,605,152 B1
(45) Date of Patent: Mar. 14, 2023

(54) DYNAMIC POSITIONAL CONTROL SYSTEM

(71) Applicant: Arnold Chase, West Hartford, CT (US)

(72) Inventor: Arnold Chase, West Hartford, CT (US)

( * ) Notice: Subject to any disclaimer, the term of this patent is extended or adjusted under 35 U.S.C. 154(b) by 0 days.

(21) Appl. No.: 17/354,595

(22) Filed: Jun. 22, 2021

(51) Int. Cl.
| | |
|---|---|
| *G06T 5/00* | (2006.01) |
| *G06T 3/40* | (2006.01) |
| *G06T 5/50* | (2006.01) |
| *G02B 27/01* | (2006.01) |
| *G06T 7/70* | (2017.01) |

(52) U.S. Cl.
CPC ........ *G06T 3/4038* (2013.01); *G02B 27/0101* (2013.01); *G06T 5/006* (2013.01); *G06T 5/50* (2013.01); *G06T 7/70* (2017.01); *G02B 2027/014* (2013.01); *G02B 2027/0147* (2013.01)

(58) Field of Classification Search
CPC .......... G06T 19/006; B60K 2370/1529; B60K 2370/349; B60K 2370/37; B60K 2370/52; B60K 2370/785; B60K 35/00; B60R 2001/1223; E06B 3/6722; G02F 1/133512
See application file for complete search history.

(56) References Cited

U.S. PATENT DOCUMENTS

| | | | | |
|---|---|---|---|---|
| 9,622,326 | B1* | 4/2017 | Devyver | ............... G09G 3/3406 |
| 9,958,870 | B1 | 5/2018 | Graybill et al. | |
| 10,046,706 | B2* | 8/2018 | Larson | ...................... B60R 1/12 |
| 10,528,132 | B1 | 1/2020 | Hassani et al. | |
| 11,048,105 | B1 | 6/2021 | Roy | |
| 11,217,032 | B1 | 1/2022 | Glazberg et al. | |
| 2005/0110416 | A1* | 5/2005 | Veskovic | .................. E06B 9/32 315/149 |
| 2005/0154505 | A1 | 7/2005 | Nakamura et al. | |
| 2008/0291032 | A1 | 11/2008 | Prokhorov et al. | |

(Continued)

FOREIGN PATENT DOCUMENTS

| | | |
|---|---|---|
| CN | 106994884 A | 8/2017 |
| JP | 6911485 B2 * | 7/2021 |

OTHER PUBLICATIONS

T. H. Tran, C. C. Pham, T. P. Nguyen, T. T. Duong and J. W. Jeon, "Real-time traffic light detection using color density," 2016 IEEE International Conference on Consumer Electronics—Asia (ICCE-Asia), 2016, pp. 1-4, doi: 10.1109/ICCE-Asia.2016.7804791.*

(Continued)

*Primary Examiner* — Li Liu
(74) *Attorney, Agent, or Firm* — McCormick, Paulding & Huber PLLC

(57) ABSTRACT

A dynamic positioning control system having a transparent or semi-transparent substrate, an image processor, and one or more image-generating elements operatively connected to the image processor configured to simultaneously generate a plurality of images within an overall image-generating-capable field area of the substrate is provided. A dynamic positioning control system having a transparent or semi-transparent substrate, a dimming controller, and a plurality of electrodes operatively connected to the dimming controller configured to dim one or more areas on or within the substrate within an overall electrochromic dimming-capable field area is also provided. The image processor and the dimming controller may be separate elements or may be a single controller.

26 Claims, 17 Drawing Sheets

(56) References Cited

U.S. PATENT DOCUMENTS

| | | |
|---|---|---|
| 2014/0313120 A1* | 10/2014 | Kamhi ............... G06K 9/00604 |
| | | 345/156 |
| 2017/0185146 A1 | 6/2017 | Groh et al. |
| 2017/0351092 A1 | 12/2017 | Nakata et al. |
| 2019/0255919 A1* | 8/2019 | Kishimoto ................. B60J 3/00 |
| 2020/0019034 A1* | 1/2020 | Lagowski ................. B60J 3/04 |
| 2020/0058256 A1* | 2/2020 | Seibert .................... G06F 1/163 |
| 2020/0081284 A1* | 3/2020 | Melcher ............. G02F 1/13318 |
| 2020/0086806 A1 | 3/2020 | Cha |
| 2020/0111259 A1* | 4/2020 | Sears ...................... G06F 3/012 |
| 2020/0379592 A1* | 12/2020 | Di Sessa ............. G09G 3/2007 |
| 2021/0055547 A1* | 2/2021 | Rao ...................... G09G 3/3208 |
| 2021/0070307 A1 | 3/2021 | Welch et al. |

OTHER PUBLICATIONS

Charissis, Vassilis, Stylianos Papanastasiou, and George Vlachos. "Interface development for early notification warning system: Full windshield head-up display case study." International Conference on Human-Computer Interaction. Springer, Berlin, Heidelberg, 2009.
Hedili, M. Kivanc, Mark O. Freeman, and Hakan Urey. "Microlens array-based high-gain screen design for direct projection head-up displays." Applied optics 52.6 (2013): 1351-1357. (Year: 2013).

* cited by examiner

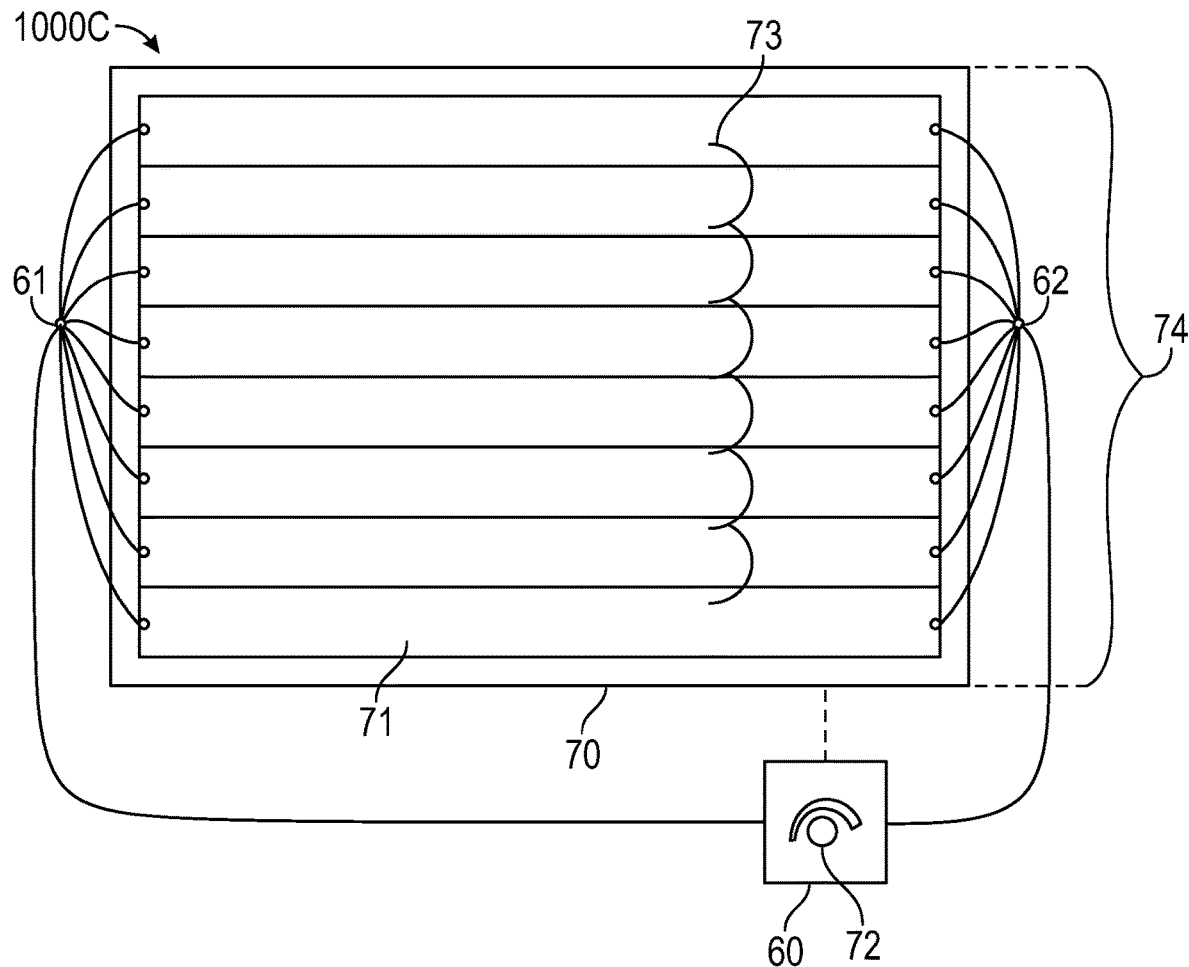
FIG. 7
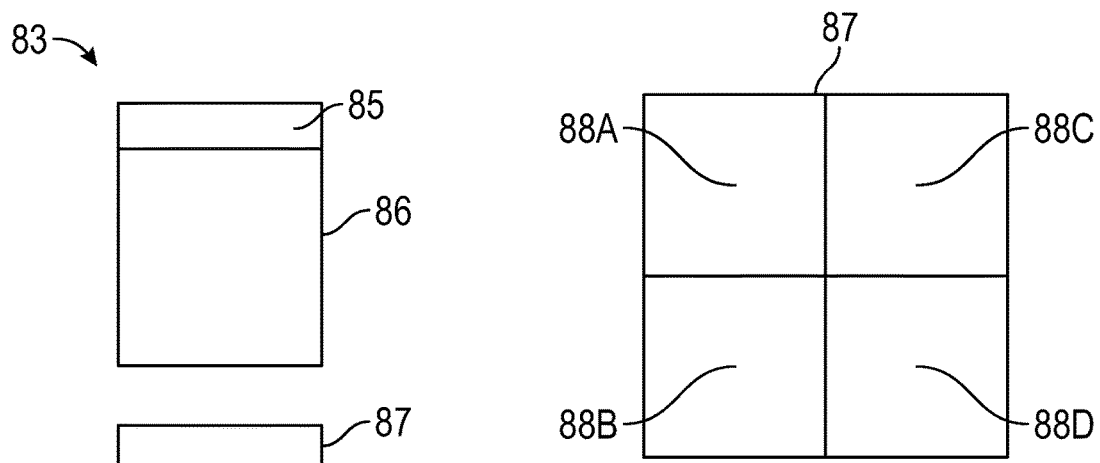
FIG. 8AA　　　　　　　FIG. 8AB

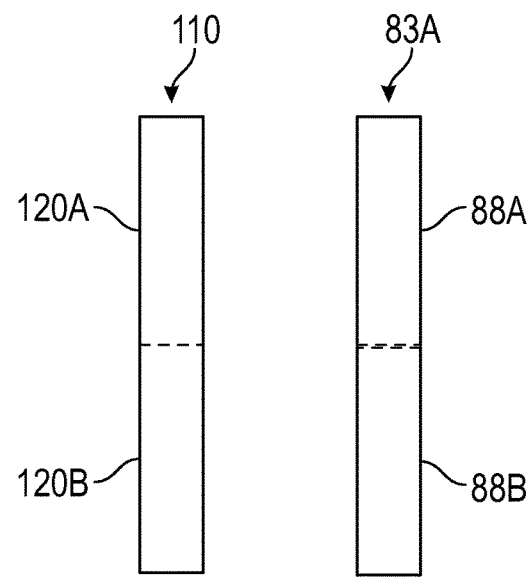
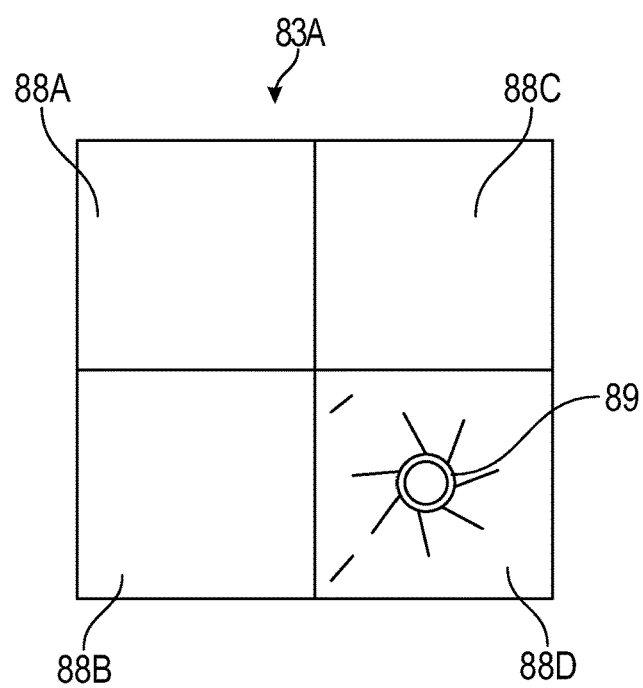
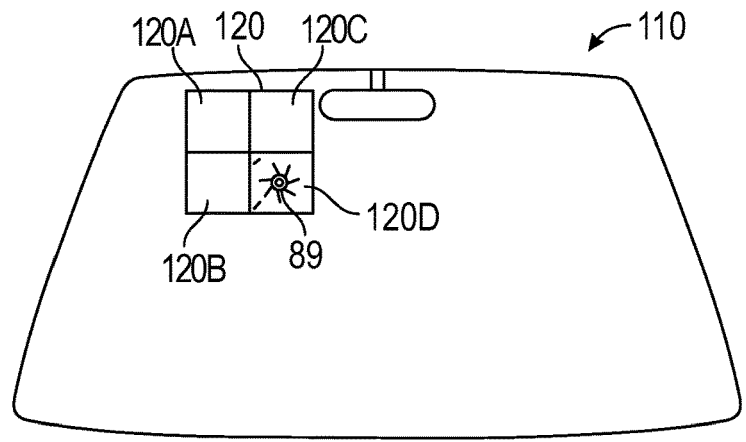
FIG. 11A
FIG. 11B
FIG. 11C

DYNAMIC POSITIONAL CONTROL SYSTEM

TECHNICAL FIELD

The present disclosure relates to a system for providing manual and/or automatic dynamic location control of specific dimming and/or active display areas within an overall transmissive glass or plastic substrate.

BACKGROUND

Image-generating systems and devices have been developed to operate within or on a transparent glass or plastic substrate material, which are capable of generating and displaying still or video images within or on the transparent material. Some of such image-generating systems and devices are often referred to as a "heads-up display." Similarly, otherwise transparent glass or plastic substrate materials have also been developed that are capable of reducing the visual transmissivity of an overall area via electrochromic means thereby controlling or regulating a transparency of the material.

SUMMARY

The present disclosure provides a dynamic positioning control system comprising a transparent or semi-transparent substrate, an image processor, and one or more image-generating elements operatively connected to the image processor configured to simultaneously generate a plurality of images within an overall image-generating-capable field area of the substrate.

In some embodiments the image processor is configured to cause the one or more image-generating elements to move a position of each of the plurality of images vertically and/or horizontally relative to the overall image-generating-capable field area.

In some embodiments the image processor is configured to cause the one or more image-generating elements to move the position of each of the plurality of images independently of each other.

In some embodiments the image processor is configured to cause the one or more image-generating elements to change a size of each image of the plurality of images independently of each other.

In some embodiments the image processor is configured to cause the one or more image-generating elements to change an aspect ratio of each image of the plurality of images independently of each other.

In some embodiments an input device is operatively connected to the image processor, and the image processor is configured to cause the one or more image-generating elements to move the position of each of the plurality of images vertically and/or horizontally within the overall image-generating-capable field area based on an input received by the input device from a user.

In some embodiments the image processor is configured to cause the one or more image-generating elements to change the size of each image of the plurality of images based on an input received by the input device from a user.

In some embodiments, the dynamic positioning control system is part of a vehicle, and the transparent or semi-transparent substrate is a front windshield of the vehicle.

The present disclosure also provides a dynamic positioning control system comprising a transparent or semi-transparent substrate, a dimming controller, a plurality of electrodes operatively connected to the dimming controller configured to dim one or more areas on or within the substrate within an overall electrochromic dimming-capable field area.

In some embodiments, the plurality of electrodes are operatively connected to the dimming controller and configured to selectively dim a plurality of the one or more areas on or within the substrate within the overall electrochromic dimming-capable field area.

In some embodiments, the dimming controller is configured to cause the plurality of electrodes to selectively move a position of the one or more dimmed areas vertically and/or horizontally relative to the overall electrochromic dimming-capable field area.

In some embodiments an input device is operatively connected to the dimming controller, and the dimming controller is configured to cause the plurality of electrodes to selectively move the position of each of the one or more dimmed areas vertically and/or horizontally within an overall electrochromic dimming-capable field area based on an input received by the input device from a user.

In some embodiments, the plurality of electrodes are configured to selectively dim the one or more areas to a plurality of different transmissivity levels.

In some embodiments at least one light sensing device is operatively connected to the dimming controller, and the diming controller is configured to cause the plurality of electrodes to selectively dim the one or more areas to a particular transmissivity level of plurality of different transmissivity levels based on a detected light angle and/or detected light magnitude detected by the light sensing device.

In some embodiments, the at least one light sensing device comprises a radially arranged multi-sector segmented light level sensing device. The at least one light sensing device may contain two or more light sensors. Each light sensor of the two or more light sensors may have a different vertical offset view angles from any other light sensors of the two or more light sensors arranged within that respective angular segment.

In some embodiments the at least one light sensing device comprises a radially arranged multi-sector segmented light level sensing device, with each angular segment within the light level sensing device containing one or more light sensors and one or more color sensors, with each light sensor having a different vertical offset view angle from any other light sensors arranged within that respective angular segment, and with each color sensor having a vertical and/or horizontal offset view angle from each other color sensor arranged within that respective angular segment.

In some embodiments at least one multi-segment light sensing device is operatively connected to the dimming controller, and the diming controller is configured to cause the plurality of electrodes to dim the one or more selective areas to a particular transmissivity level of plurality of different transmissivity levels based on a detected light angle and/or detected light magnitude detected by the multi-segment light sensing device. The multi-segment light sensing device may comprise four or more independent sub-sensor areas, with each sub-sensor area being operatively connected to the dimming controller. The dimming controller may be configured to compare the lumen level detected by each sub-sensor area and determine if one or more sub-sensor areas is receiving a higher lumen level than the other sub-sensor areas and cause the plurality of electrodes to selectively dim a particular area of the one or more areas corresponding to the sub-sensor area receiving the higher lumen level.

In some embodiments a color sensor is operatively connected to the dimming controller, and the dimming controller is configured to selectively not allow the transmissivity level of the selectively dimmed one or more areas to fall below a predetermined threshold if a color is detected within said area(s) indicative of a traffic light signal.

The present disclosure also provides a dynamic positioning control system comprising a transparent or semi-transparent substrate, an image processor, one or more image-generating elements operatively connected to the image processor configured to simultaneously generate one or more images within an overall image-generating-capable field area of the substrate, a dimming controller, and a plurality of electrodes operatively connected to the dimming controller configured to selectively dim one or more areas on or within the substrate within an overall electrochromic dimming-capable field area. The image processor and the dimming controller are separate elements or are a single controller.

In some embodiments, the selectively dimmed one or more areas are configured to obscure the one or more images from view on a first side of the substrate and not obscure the one or more images from view on a second side of the substrate.

BRIEF DESCRIPTION OF THE DRAWINGS

FIG. 7 shows an overall electrochromic dimming-capable field area within a substrate of a dynamic positioning control system with multiple selectively dimmable sections in accordance with the present disclosure;

FIG. 8AB shows a multiple segment light sensor of a dynamic positioning control system in accordance with the present disclosure;

FIG. 8AC shows a light sensor of a dynamic positioning control system in accordance with the present disclosure;

FIG. 11A shows a side profile of a multi-section dimmable substrate and a multi-section light sensor in accordance with the present disclosure;

FIG. 11B shows a straight-on view of a four-section light sensor indicating sun glare in accordance with the present disclosure;

FIG. 11C shows a vehicle windshield that is equipped with a four-section dimming capable field with sun glare in accordance with the present disclosure;

DETAILED DESCRIPTION

Figure 1:
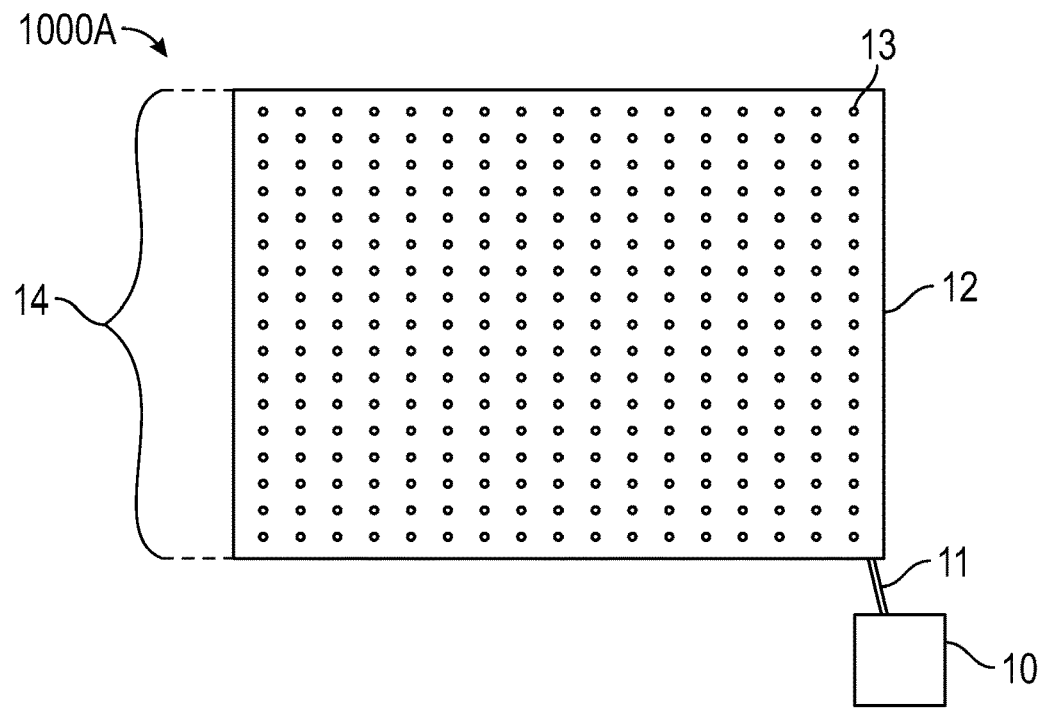
FIG. 1 shows an overall image-capable field area of a dynamic positioning control system containing image capable elements within a substrate that is operatively connected to an image processor in accordance with the present disclosure.
Figure 2:
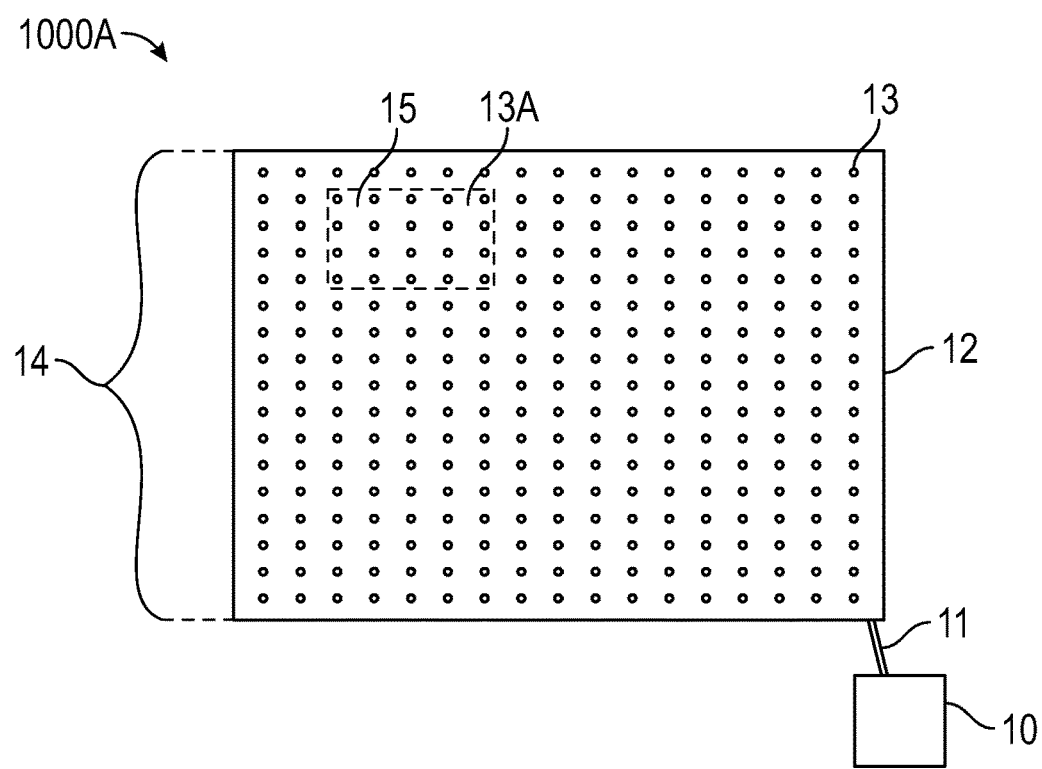
FIG. 2 shows the overall image-capable field area of FIG. 1 with an active image being displayed at a first position from the active image elements in accordance with the present disclosure.
Figure 3:
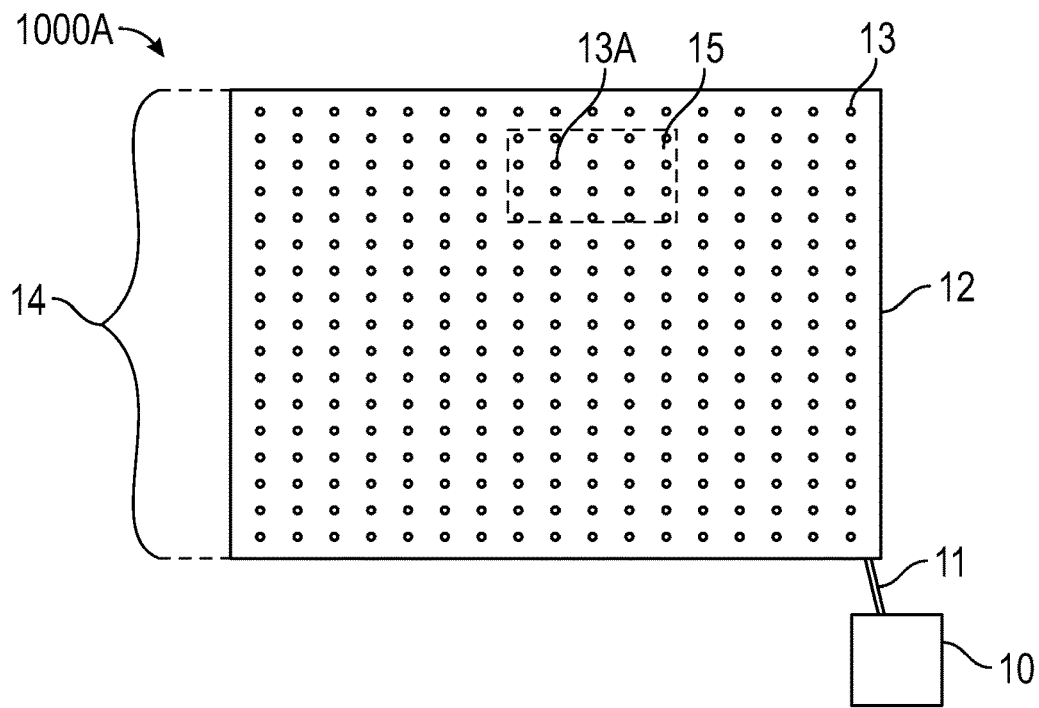
FIG. 3 shows the overall image-capable field area of FIG. 1 with an active image being displayed at a second position from the active image elements in accordance with the present disclosure.
Figure 4:
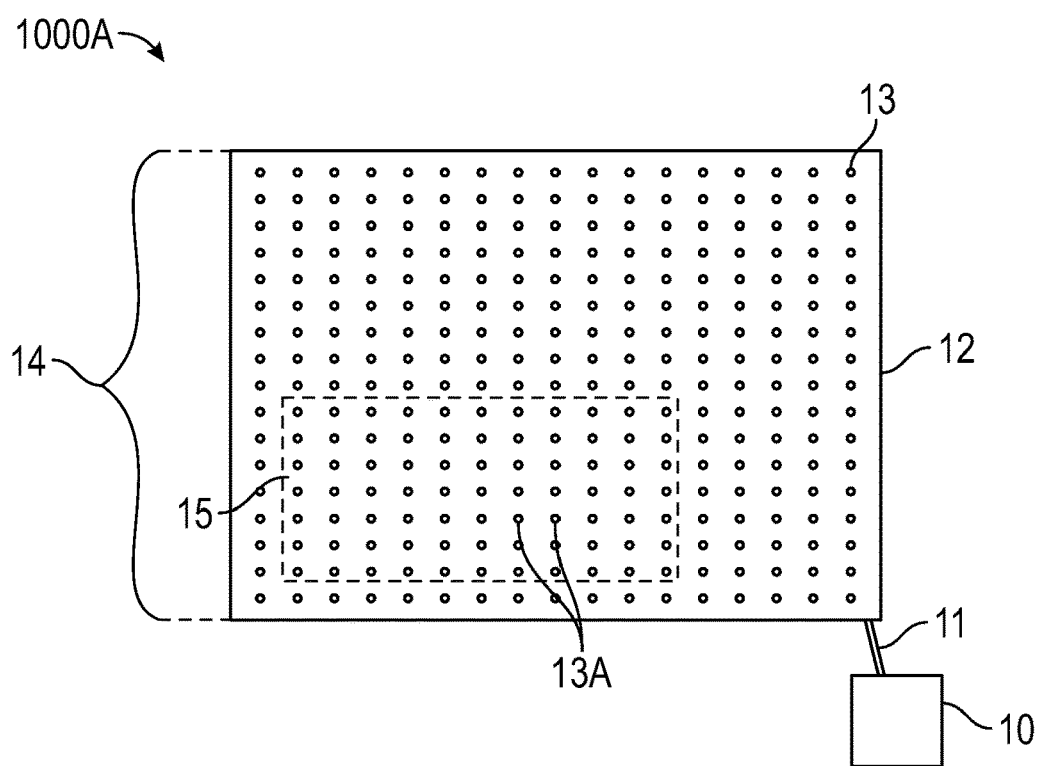
FIG. 4 shows the overall image-capable field area of FIG. 1 with an active image being displayed at a third position from the active image elements in accordance with the present disclosure.

Before various embodiments are described in further detail, it is to be understood that the present disclosure is not limited to the particular embodiments described. It will also be understood that the methods and apparatuses described herein may be adapted and modified as appropriate for the application being addressed and that the devices, systems and methods described herein may be employed in other suitable applications, and that such other additions and modifications will not depart form the scope thereof.

Although various features have been shown in different figures for simplicity, it should be readily apparent to one of skill in the art that the various features may be combined without departing from the scope of the present disclosure.

The present disclosure improves upon known picture or image generating systems and methods by providing for the ability to manually and/or dynamically control, and/or shift location(s) of partial active areas from among a larger total substrate area for the purpose of displaying an image, dimming, or a combination of both functions simultaneously.

The present disclosure provides a dynamic positional control system ("DPCS") that allows for the activation and electronic X/Y axis movement (i.e. planar or substantially planar movement) of selectively activated display elements within a larger field area, or the electronic X/Y movement of one or more dimming sections of the display(s) so as to selectively position the desired location of the display area(s) and/or dimming area(s) within any contiguous area that contains picture and/or dimming elements.

A first exemplary DPCS embodiment according to the present disclosure provides dynamic sun glare reduction of a window(s) of a driven vehicle, where inevitably there is the need for the reduction/mitigation of perceived sun glare relative to the seated position of a driver. While driven vehicles have long been equipped with physical sun-visors that flip-down and/or swivel to block sun glare that would interfere with the driver of the vehicle, 'traditional' sun-visors require the driver to repeatedly manually adjust and re-adjust the position of the sun-visor to match the relative position and incoming angle of the perceived location of the sun glare that is affecting the driver's vision. Advantageously, a DPCS provides for the automatic dynamic mitigation of sun glare that is directed toward the driver, regardless of the relative location and direction of the sun glare during changes in the heading of a vehicle, changes in the attitude of a vehicle, different relative angles due to the sun's arc angle at any given day and time, etc. While conventional transparent (or semi-transparent) displays or screens have been offered for the capability to electronically and/or manually dim an overall panel of electrochromic glass, a DPCS provides for continuous dynamic automatic positioning and responsiveness of a dimmed area(s) to instantaneous sun glare regardless of its bearing relative to a vehicle's driver.

DPCS uses one or more light sensors to determine the angular bearing of the incoming sunlight relative to that of the driver, and then automatically selects and actively dims an appropriate corresponding dimmable area(s) or section(s) from among multiple such areas residing in a forward and/or side perimeter arc around the driver. Once the area of detected sun glare disappears from a particular directional bearing or location, the corresponding electrochromic panel area and/or section dynamically de-energizes and the substrate becomes more transparent again. This means, for example, that instead of the driver's left side window having just a conventional capability to dim, for example, an entire window, with a DPCS there can be dynamic and selective activation of just one or more needed partial window sections from among the entire potential dimmable area(s) thereby leaving the unneeded sections or areas transparent (or at least more transparent than the needed dimmed partial window sections).

A second exemplary DPCS embodiment allows different non-contiguous sections of a transparent OLED, or other comparable display technology embedded in a window or pane of glass, plastic, or other transparent material, to be independently activated, adjusted and/or "moved" within an entire potentially active display area of a window or transparent material. Current displays that show distinct separate functional regions or areas (e.g. speed, temperature, navigation instructions, etc.) are in reality just segments of the same fixed area active display and are not the same as a DPCS according to the present application. With DPCS, there is the capability for multiple windows (or active image areas), with all of the separate windows (active image areas) being separate (e.g. not contiguous) and having independent positioning movement capability within a total potentially active field area.

Such window (active image area) movement may be accomplished by selectively activating/deactivating a partial subset of display elements (e.g. pixels or other image generating elements) amongst the total overall active image generating elements within a potentially active field area. This would be analogous, for instance, to manipulating an image that is being projected and displayed on a reflective viewing screen whose potential total viewing area would be larger than any given projected image(s). The active image(s) may be moved anywhere within the confines of the reflected screen and may be made larger or smaller as desired, in this exemplary case by optical means such as a zoom lens attached to a moveable projector. In the present disclosure, we face the much harder task of moving an image that is actively generated by fixed image elements that dynamically and individually selectively become "active" rather than being just a passive reflecting surface as shown by the prior example.

Unlike conventional systems or devices, the dynamic positioning accomplished by a DPCS according to the present disclosure is not like the conventional "picture in a picture" or "quad splitting" picture generating features which are essentially just a dynamic re-assignment of source material among all of the active pixels within a predetermined and fixed/framed overall panel. In such conventional picture (image) generating devices, all of the picture (image) elements within a defined overall frame or bezel area are always on or "live", just the displayed content of each element changes. In contrast to such conventional devices, a DPCS according to the present disclosure dynamically activates and deactivates just those picture generating elements that are needed to dynamically generate and display one or more active picture areas.

While conventional display devices utilize fixed or pre-defined locations of "active" transmissive display components within a defined location in which to generate or alter/split an existing active image into divided sub-segments of an overall already established and fixed boundary image, a DPCS utilizes an oversized area (relative to the total desired "active" area(s)), with the entire field area containing more picture generating elements than what would be required for the largest desired active display requirement (absent a desire to utilize the entire field area as a conventional non-moveable, fixed sized display).

As an example, presently if it is desired to have an active 1920×1080 pixel image presented on a display capable substrate, typically the same number of display component elements (e.g. 1920×1080) would be utilized in a fixed/predetermined and framed/bordered area. A DPCS on the other hand, might utilize an exemplary total field area array of 4000×4000 pixels to support the exemplary 1920×1080 pixel image allowing a user the ability to selectively control which portion(s) of the 4000×4000 pixel array would be selected and utilized in order to effectuate a virtual "movement" of the desired 1920×1080 pixel image anywhere within the entire potential 4000×4000 pixel field area.

A DPCS according to the present disclosure may effectively and virtually allow an up and down, as well as side to side, movement (i.e. repositioning) of the desired 1920× 1080-pixel exemplary image to be accomplished without taking away any pixels or resolution from the original image, which would then also allow for zooming or shrinking of image(s) anywhere within the 4000×4000 pixel array area to be achieved. A DPCS with its dynamic pixel activation ability is also capable of dynamically changing the aspect ratio of a displayed image to match, for instance, the aspect ratio or orientation of non-traditional or varied source content. As an example, with conventional fixed aspect ratio displays, when a film that was made and encoded in a 2:35 to 1 wide-screen aspect ratio needs to be displayed on a fixed 1:85 to 1 ratio (e.g. 1920×1080) display device, black bars are typically generated both above and below the visible image in order to properly display the full width of such a film on a fixed 1:85 to 1 display. These black bars are wasted active picture elements that are operational, but just displaying "black" and, thus, the full resolution of the display is lost. With a DPCS, only those picture elements that are actually needed to be utilized are used, thus allowing those elements that would have otherwise been wastefully utilized in displaying black to be reassigned for other active display purposes.

With DPCS, an image's location may be stationary anywhere within (or including) the total array field area, or an image smaller than the maximum field area size may be repositioned to match the displayed image's location relative to the location of a particular person's viewing position.

As with the dynamic controlling of active display areas, in some embodiments, areas of electrochromic dimming elements may also be spatially controlled and aligned to automatically match up with and track any selected active display elements to additionally provide a linked and dynamically moveable non-transparent framing background (or at least less transparent than the substrate) that spatially matches or exceeds that of an active image area(s). This may enhance the perceived contrast of an active "see through" image area of clear substrate, and may also provide a rear or reverse side privacy shield to prevent any actively displayed content from being seen from behind an active image such as would occur if viewed from the outside of an automobile window.

With the growing adoption of autonomous vehicles, in which window glass may be also used for display purposes on all interior sides of a vehicle, it may be desirable to alternatively use all of the windows as multiple display screens for entertainment, navigation progress displays, emails, business purposes, etc. A DPCS may advantageously dynamically shield sensitive content or documents from being viewed by parties outside of a vehicle.

Typically, while a dimming-capable layer would be beneath an active display layer (as seen from a viewer's perspective), there may be opportunities where the layer orientation or an additional number of layers may be altered or added in order to display images, identification information, etc. on a purposeful basis to outside parties. In such cases, the layer orientation may be reversed, with the display elements present on the layer nearest the outside. In another embodiment, image-generating element layers would be located on both sides of a dimming layer to allow simultaneous inside and outside displays, with the dimming layer effectively isolating the display elements to each viewable side.

In some embodiments, the same type of dynamically directed activation of substrate dimming technology that is used in conjunction with tracking areas of an active display for sun glare mitigation may also be used on a stand-alone basis to dynamically dim a specific part of the windshield and/or side windows that are otherwise allowing area(s) of incoming light over a certain lumen level, for example, to eliminate the "dazzle" to a driver from oncoming headlights from occurring. In such embodiments, the dynamic localization, sizing, and dimming activation ability may be determined by locational technology from sensors in the vehicle itself. As the relative positions between, for instance, a vehicle that is the source of headlight dazzle and a vehicle's driver being affected by the offending light changes, the DPCS can automatically and dynamically adjust the X/Y position(s) of the substrate dimming in the affronted vehicle as well as select and adjust the needed size of the dimmed area(s), along with the degree of the selected area dimming commensurate with the area and intensity of the headlight glare level challenge.

While active display or dimming control elements may be typically embedded within a common layer(s) of glass or plastic substrate such as is the case within automotive safety glass, the display and/or dimming control elements may also be incorporated within an entirely different physical layer that, for example, may independently be able to rise up from within a common window channel to be positioned parallel to a traditional piece of glass or plastic.

While an earlier description discussed the use of one or more layers of substrate material to dynamically effectuate specific subset area dimming, the same core technology may instead use an applied segmented film material layer(s) to effectuate the same simultaneous independent area dimming control.

Figure 5:
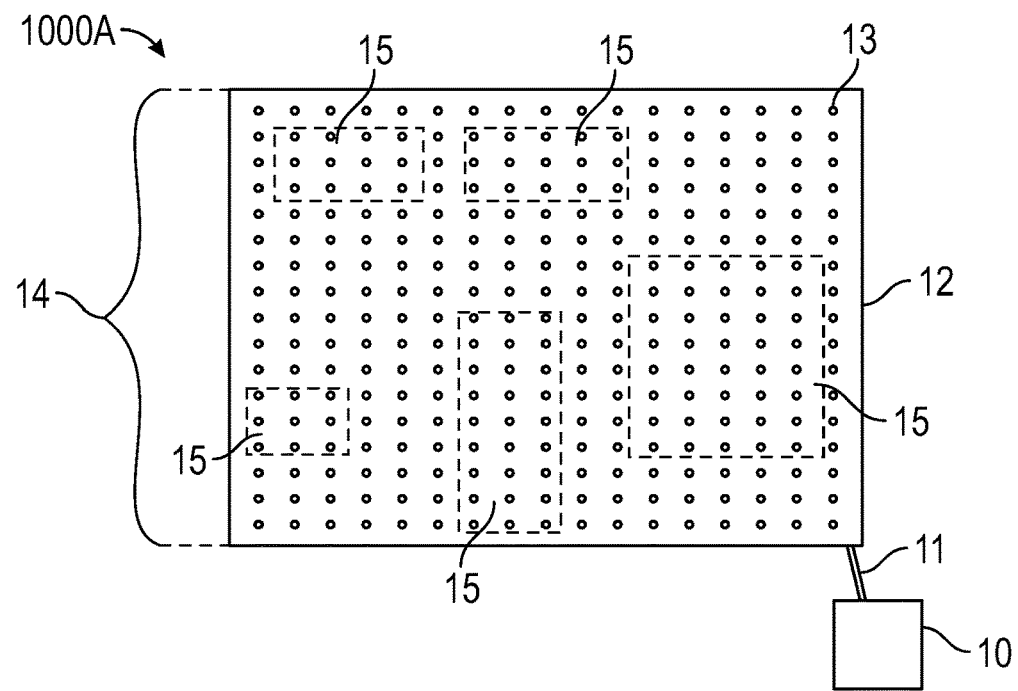
FIG. 5 shows the overall image-capable field area of FIG. 1 with multiple simultaneous active images being displayed from the active image elements in accordance with the present disclosure.

Referring to FIGS. 1-5, an exemplary dynamic positioning control system (DPCS) 1000A comprises an image processor 10 with an operative connection 11 to a transparent (or semi-transparent) panel 12 that is equipped with one or more image-generating elements 13 within an overall image-generating-capable field area 14. The video processor 10 is configured to generate an image formation, sizing, orientation, and scaling of image(s) 15 generated by the image-generating elements 13 by assigning and activating one or more desired subset(s) of available image-generating elements 13 from within the overall image-generating-capable field area 14. The size and/or aspect ratio of the one or more images 15 may be increased or decreased by activating more or less desired image-generating elements 13 (active image-generating elements are shown and described herein as "13a"). Further, the location(s) and/or orientation(s) of the one or more images 15 may be shifted up or down and/or side-to-side and/or rotated by synchronously activating/deactivating various image-generating elements 13 anywhere within the overall image-generating-capable field area 14, i.e., the total potential display element area boundaries, as illustrated in FIG. 5. The images 15 may be still and/or moving images. If no positional control is desired, just a single image 15 may be displayed by DPCS up to the full limit of the overall image-generating-capable field area 14. Referring to FIG. 5, the active display images 15 may have varying sizes, aspect-ratios, locations and/or orientations.

Unlike conventional display devices where all of the image-generating elements in a defined field area are always active regardless of what programming content is being displayed, in some DPCS embodiments, only the image-generating elements 13 that have been selected to become active to display an image(s) 15 are made active, as illustrated by the differences between 13 and 13a in FIGS. 1-5.

A DPCS according to the present disclosure may be configured with default preset areas within an overall image-generating-capable field area 14 in which to locate one or more images 15, but also offers the ability to shift a desired active display to any location within the overall image-generating-capable field area 14 boundary area and/or resize a desired active display.

This ability to shift display(s) into different locations within the overall field area may be accomplished by both automatic means (e.g., presets) as well as utilizing manual positioning controls such as up/down and left/right buttons or knobs, the ability to move an image by moving a finger on a touchpad, the use of a mouse or trackpad, or any other known pointing device or input device. By using an additional input key such as an "alternate" (ALT) key on a keyboard along with the original pointing or selection device, the up/down and left/right functions may instead be used for image size increases or reduction, as well as aspect ratio changes, or other alternate uses.

Figure 6:
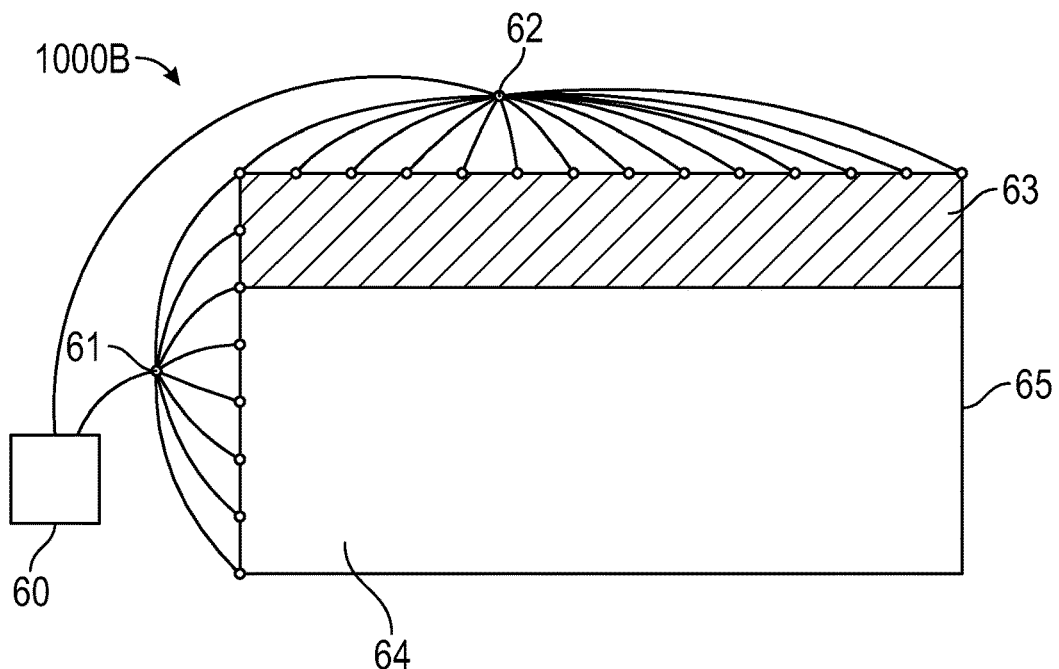
FIG. 6 shows an overall electrochromic dimming-capable field area within a substrate of a dynamic positioning control system with a selectively active dimming area in accordance with the present disclosure.

Referring to FIG. 6, another exemplary DPCS 1000B is shown. DPCS 1000B comprises a dimmable panel 65 having an overall electrochromic dimming-capable field area 64 within or on a substrate. The overall electrochromic dimming-capable field area 64 is configured to have one or more dimming-capable areas 63. Each of the various dimming-capable areas 63 are operatively connected to Y-axis electrodes 61 and X-axis electrodes 62, which are operatively connected to a dimming controller 60. It should be noted that the overall size of the total dimmable area within an overall substrate as well as the orientation (e.g. vertical/horizontal/diagonal) of the individual dimmable segments may differ from the exemplary illustration.

Similar to the overall image-generating-capable field area 14 discussed above, the DPCS 1000B may also be used in a manner to control a substrate layer of electrochromic or other manner of electronic dimming-capability within specific area(s) 63 of the overall electrochromic dimming-capable field area 64. The substrate may be a pane of glass, plastic, or other polymer, within fixed or movable windows either for interior or exterior wall use, or automotive windows and/or windshields, and the like. As with the active image display embodiment, the DPCS 1000B is able to virtually shift the positions of a dimmed area from one specific area 63 to another specific area 63, as well as control the depth (or amount/level) of dimming for each electrochromic or other dimming substrate area(s) within the overall electrochromic dimming-capable field area 64. The dimming positions may be set manually or automatically selected and activated with a dynamic dimming control system within the dimming controller 60, and would allow the same or similar virtual controllability that is capable of being achieved by the active image-generating embodiment, but in electrochromic dimming embodiments, the DPCS 1000B would be configured to control and dim specific areas 63 within an overall electrochromic dimming-capable field area 64. In the dimming embodiment, instead of moving or altering the size of an active image by activating/deactivation individual image-generating elements, the DPCS 1000B would instead virtually move or resize an area of active dimming by combining or eliminating contiguous dimmable areas from within the full field area boundaries of the overall electrochromic dimming-capable field area 64. The dimming controller 60 provides either a manual capability to selectively adjust the depth of dimming from among the selected dimmable areas or the areas may be automatically and dynamically dimmed through the dimming controller 60. Various dimmable areas from among an overall dimmable field may be dimmed either in unison or dimmed to different dimming depths among the various individual sections of a dimmable substrate.

Referring to FIG. 7, an overall electrochromic dimming-capable field area 74 of a DPCS 1000C with a substrate 71 arranged within a fixed frame 70 is shown. The overall electrochromic dimming-capable field area 74 is equipped with multiple separate adjacent dimmable sections 73 in accordance with the present disclosure. The fixed frame 70 holds the window substrate 71. The multiple adjacent independently dimmable sections 73 are configured to mimic, for example, the operation of mechanical venetian blinds when the adjustment knob 72 is turned to thereby communicate a desired adjustment to the dimming controller 60. Although, any input device may be used in alternative, or in addition, to the adjustment knob 72.

In addition to automatic dimming control of various segments within an overall substrate holding fixed frame 70, the DPCS 1000C may also be operated in a manual mode, for instance, with a fixed building window location to simulate a scrolling venetian blind effect within the substrate 71 where, for example, the control knob 72 turn adds or subtracts adjacent dimmed horizontal sections 73 that simulate the raising or lowering of a venetian blind.

While traditional electrochromic dimming embodiments typically uniformly control the dimming for an entire panel and/or a total dimmable area (e.g. 64), a DPCS adds multiple electrodes operatively connected to both the "X" as well as "Y" axes (as discussed above 62 and 61, respectively) between a dimming controller 60 and a dimmable panel 65 to uniquely allow for specific subset area(s) 63 to be simultaneously and independently controlled and dimmed. In some embodiments, a total dimmable area comprises a plurality of independently dimmable panels/substrates that are closely arranged together to give the appearance or impression of a single panel, similar to how television screens or monitors can be ganged together in order to display different partial images of a total overall image that, when viewed together, gives the appearance of a single screen. Each panel of the plurality of dimmable panels/substrates includes its own electrode(s) for controlling the dim level of the panel/substrate. Each panel may have its own dedicated dimming controller 60 and/or be connected to a single dimming controller 60. Thus, for example, in the venetian blind effect embodiment discussed above, each "blind" panel/substrate may be an independent dimmable panel 65 that is activated in succession to give the appearance of a venetian blind dimming effect.

The selective dimming of a DPCS of the present disclosure should not be confused with "local dimming" as is commonly referred to in connection with television set LCD backlighting, which alters the backlight lighting level(s) for selected areas of pixels to enhance the perceived contrast. With a DPCS, the dimming process is designed to control the transmissivity of ambient or other outside light sources from passing through a dimmable substrate, not controlling an internally generated LCD backlight lighting source.

In some DPCS embodiments, the device or system is configured for an automatic and dynamic mode of dimming for various purposes. In the automatic mode, one or more types of light sensing devices such as, for example and without limitation, photocells, pyranometers (solar radiation sensors), video imaging devices, or the like are used as data inputs to the DPCS image processor. The automatic mode may be used, for instance, to mitigate sun glare during operation of a vehicle in an effort to protect a vehicle's driver (or other occupant) from being temporarily blinded by the sun glare. One or more known light sensing devices may be arranged and operatively connected to the image processor which would allow active and dynamic control of dimming for one or more dimming-capable areas or subsets of a complete windshield or window.

Figure 8A:
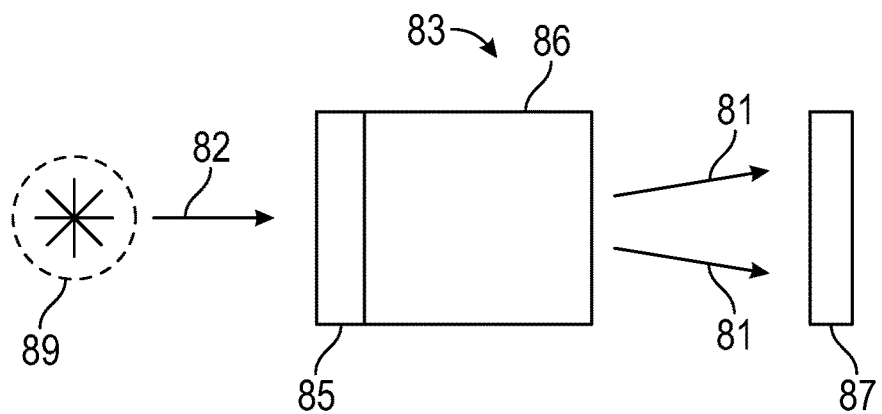
FIG. 8AA shows a light sensor of a dynamic positioning control system in accordance with the present disclosure.

Referring now to FIGS. 8AA-8AC and 8B, a segmented light sensor for a DPCS is schematically shown in accordance with the present disclosure. Referring first to FIG. 8AA, a segmented light sensor 83 that has the capability to discern area differentiation is shown. Segmented light sensor 83 includes a lens 85 functionally associated with an optical tube 86 for directing light to a segmented light sensor field 87. Lens 85 may be provided as one or more lens elements. Optical tube 86 may be provided as a waveguide, as one or more optical fibers, or as any other suitable optical guide. As best shown in FIG. 8AB, segmented light sensor field 87 includes a plurality of individual light-sensing segment areas 88A-88D. In this example embodiment, the segmented light sensor field 87 contains two horizontal segment areas 88A and 88C over another two horizontal segment areas 88B and 88D in order to provide both vertical and horizontal positional differentiation within each segmented light sensor 83. In other words, the internal sensor segment area layout may resemble a colonial-type window layout in which separate but contiguous window elements are laid out in a grid-type fashion.

The number, size and shape of the light-sensing segment areas 88 can be varied depending on need. For example, any of the separate light-sensing segment areas 88 within the segmented light sensor field 87 may be expanded or reduced, as well as modifying the sensing area sizes and shape(s) as needed. As best shown in FIG. 8AC, an amount 82 of ambient light 89 impinges upon and enters segmented light sensor 83 through lens 85 into optical tube 86 and exposes each of the light-sensing segment areas 88A-88D of segmented light sensor field 87 to a specific portion 81 of the impinging amount 82 of ambient light 89 entering the segmented light sensor 83.

According to a preferred embodiment, each segmented light sensor 83 may contain a micro-lens 85 attached to an optical limiting tube 86. By utilizing various interior cross-section shapes of the tube such as round or tubular, further shaping and refinement of the field of view of the area of the segmented light sensor field 87 may be made, for example, by drastically limiting the angle of light acceptance. Thus, for example, in operation, specific light such as sun glare 89 would enter the micro-lens 85 through the optical tube 86 and strike 81 the segmented light sensor field 87.

Figure 8B:
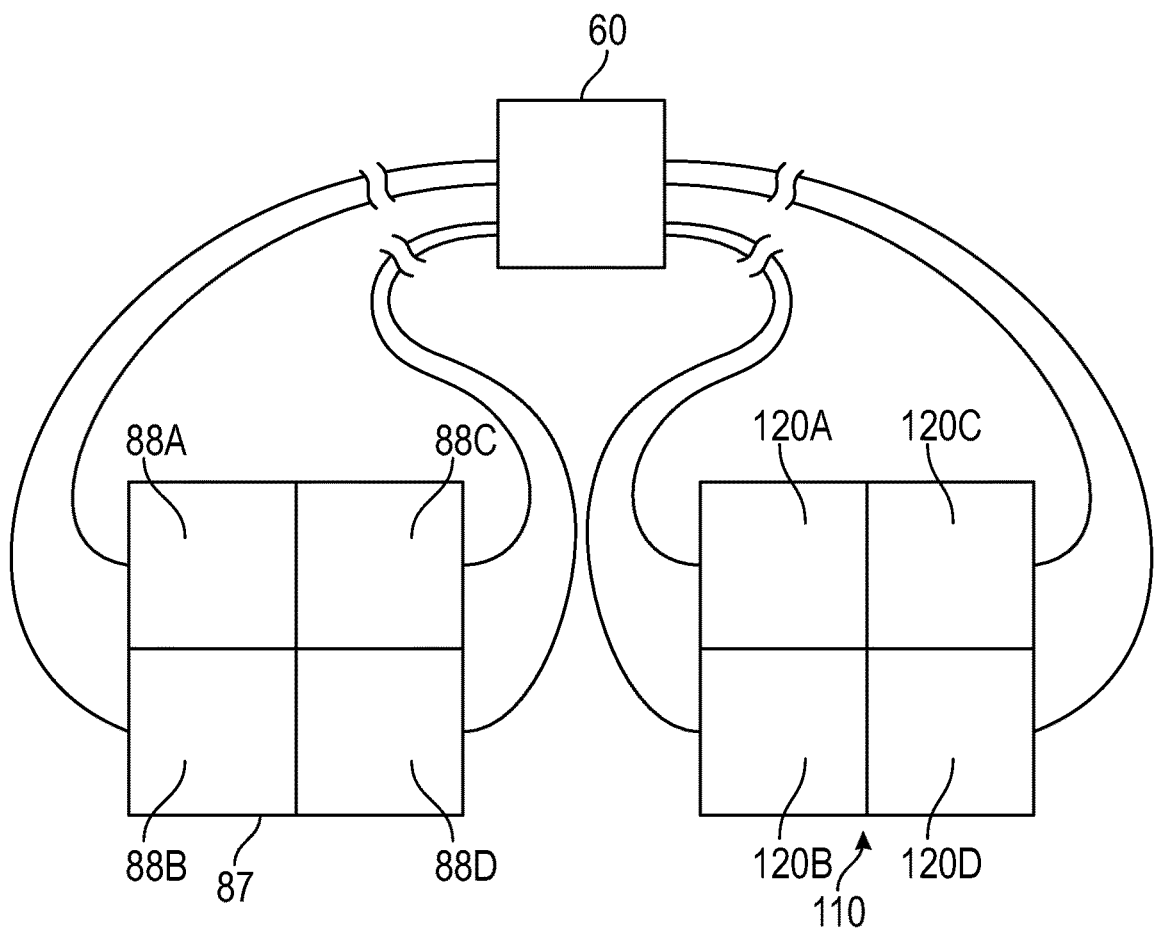
FIG. 8B shows a schematic operative relationship between a multi-segment light sensor and a multiple area dimmable substrate of a dynamic positioning control system in accordance with the present disclosure.

Referring to FIG. 8B, an example of a schematic operative relationship between a multi-segment light sensor field and a multi-section dimmable substrate is shown. In this particular example, the individual light-sensing segment areas 88 within the segmented light sensor field 87 are contiguous and laid out in a grid-type fashion. Each of the light-sensing segment areas 88 is shown operationally connected to a DPCS dimming controller 60 which would analyze in real-time (e.g., either continuously or semi-continuously) and compare the light readings of all of the light-sensing segment areas 88 from each multi-segment light sensor field 87 to establish an average light level reading. Dimming controller 60 would then analyze each light-sensing segment area 88 for a positive brightness difference above a preset differential level between a segment area 88 that positively differs in level compared to the average brightness of all light-sensing segment areas 88 in the multi-segment light sensor field 87 to find a higher lumen level outlier(s). As further shown in FIG. 8B, DPCS dimming controller 60 is operationally connected to dimmable sections 120 of a transparent or semi-transparent multi-section dimmable substrate 110. Based on the analysis of the multi-segment light sensor field 87, dimming controller 60 would effectuate the dimming of one or more of the corresponding dimmable sections 120.

Figure 9A:
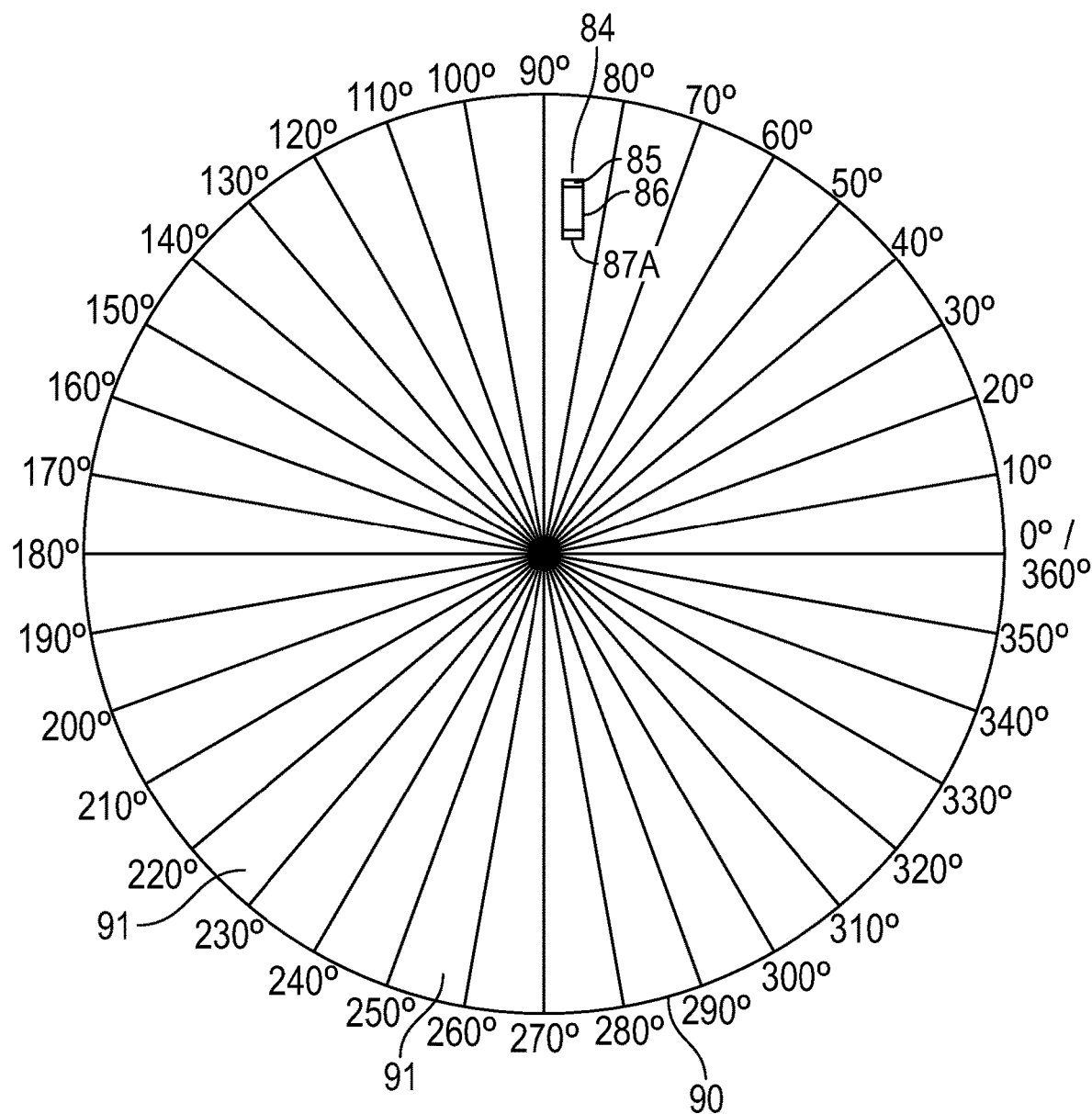
FIG. 9A shows a schematic top view of a light sensing device with multiple separate segments that each contain light sensors in accordance with the present disclosure.
Figure 9B:
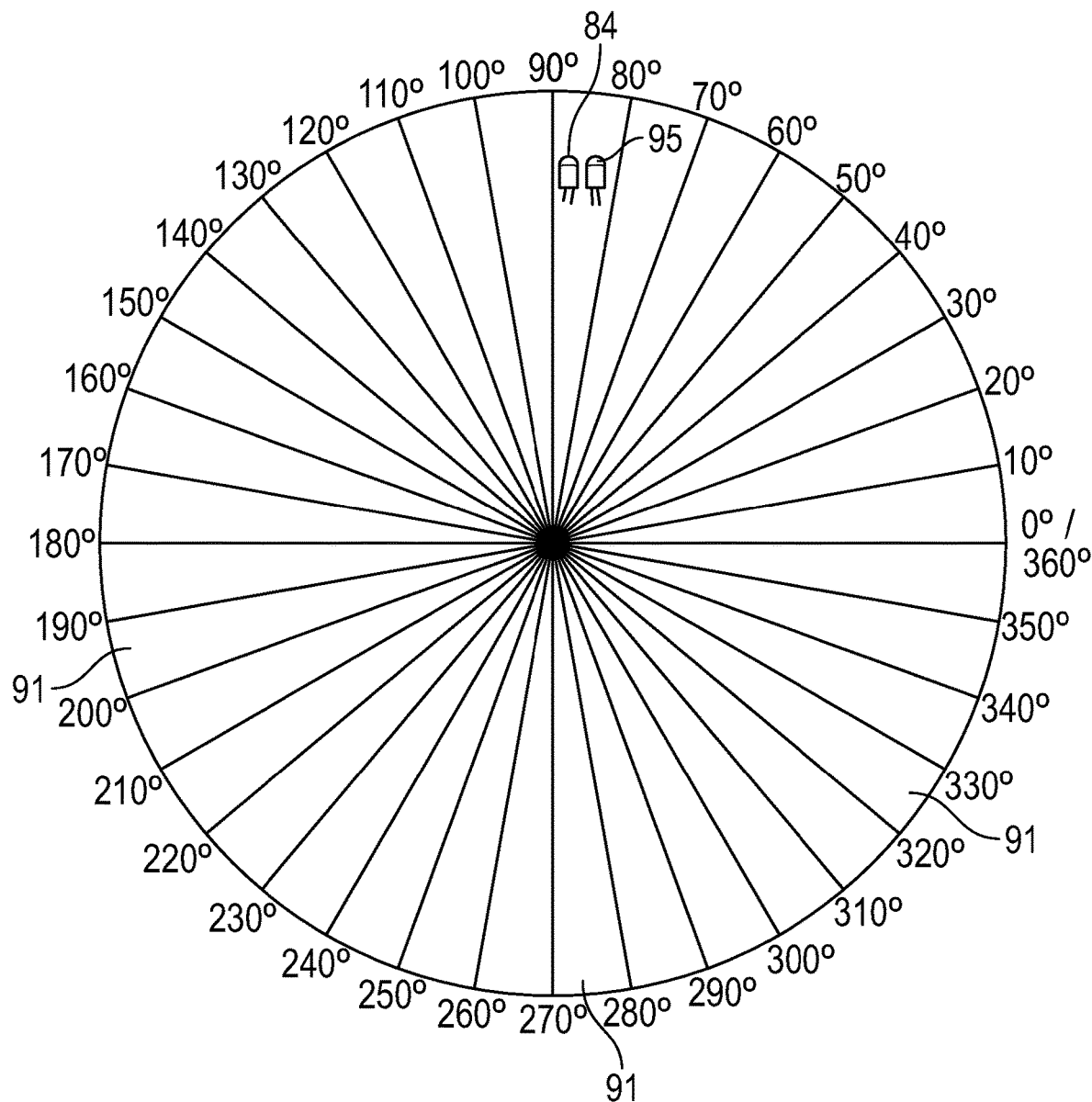
FIG. 9B shows a schematic top view of light sensing device that contains multiple separate segments that each contain one or more light sensors and color sensors in accordance with the present disclosure.
Figure 9C:
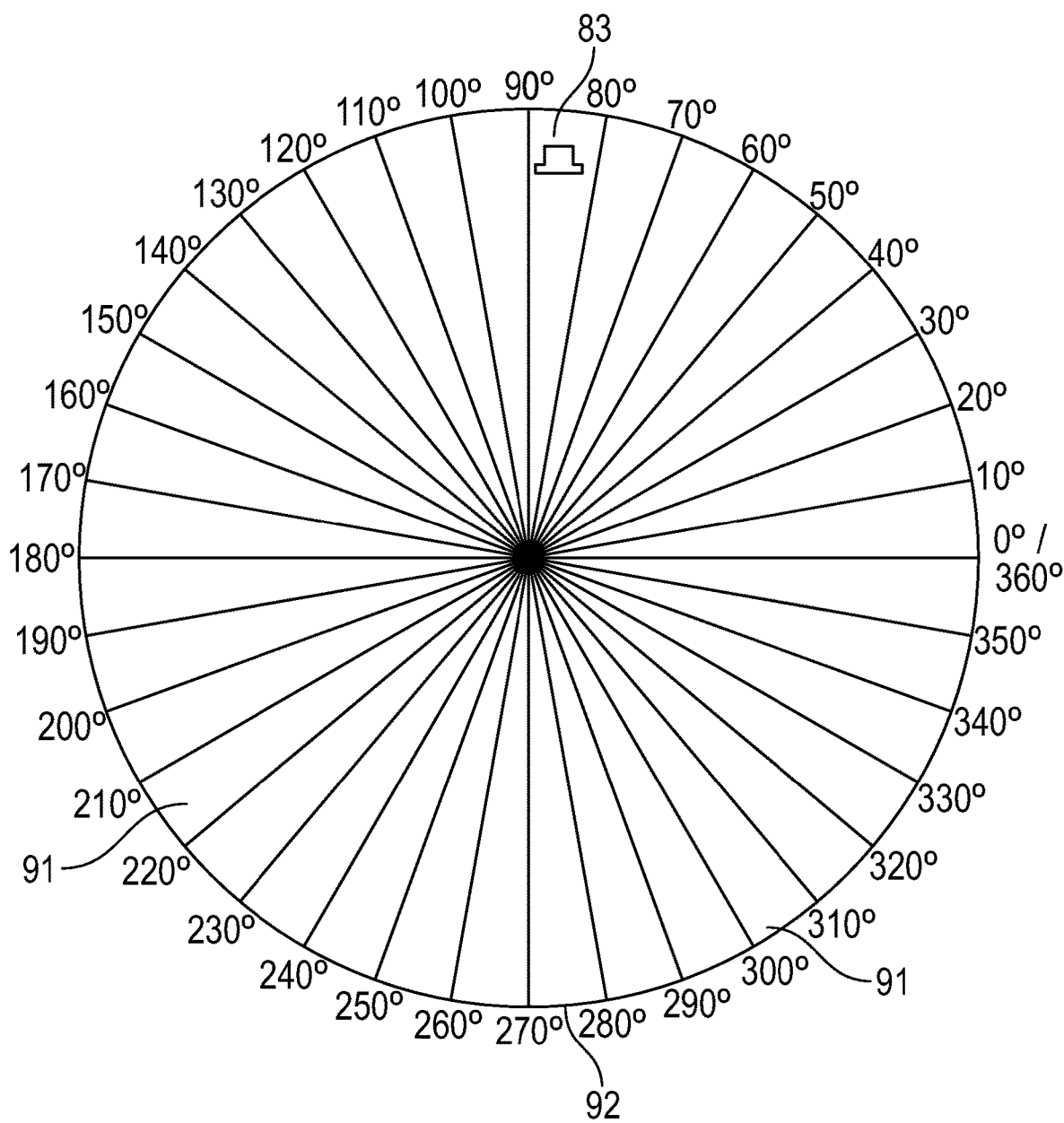
FIG. 9C shows a schematic top view of light sensing device with multiple separate segments that each contain multiple section light sensors in accordance with the present disclosure.

Referring now to FIGS. 9A-9C, light-sensing devices 90, 92 with multiple separate segments 91 that each contain light sensors 84 are shown. In FIG. 9A, a first light sensor embodiment and method utilizes a unique multiple radial segment light-sensing device 90 as an input to the DPCS dimming processor 60. This light-sensing device 90 consists of multiple independent sensing segments 91 with each segment containing a discrete light-sensing element 84. Similar to light-sensing element 83 (as described above), light-sensing element 84 includes a lens 85 functionally associated with an optical tube 86 for directing light to a light sensor field. However, while the light sensor field of light-sensing element 83 is a segmented light sensor field 87 having multiple light-sensing segment areas 88, the light sensor field 87A of light-sensing element 84 includes a single light-sensing segment area 88. In essence, light-sensing element 84 is a simplified version of light-sensing element 83.

The light-sensing device 90 may typically be horizontally mounted above the driver's head and with each angular sensing segment 91 being arranged contiguously in a radial fashion around a central axis point. Each angular sensing segment's 91 view angle would be physically designed in order to inherently and purposefully limit the light sensor's horizontal viewing ability for each angular sensing segment 91 to just a limited width horizontal viewing area such as a 15-degree horizontal slice. As discussed above, the output(s) of each sensor 84 may be operatively connected to the DPCS dimming processor 60 wherein the processor would recognize in which of the angular sensing segment(s) 91 a sensor(s) was reporting a light level exceeding a preset overall lumen level trigger threshold. The dimming processor 60 may then activate one or more dimmable sections 120 of the multi-section dimmable substrate 110 (e.g., a multi-section dimmable windshield and/or multi-section dimmable side windows) that corresponded to the angular sensing segment(s) 91 that corresponds to the horizontal bearing of the triggered angular sensing segment(s) 91, relative to the driver's position in the vehicle. In addition to the dimming processor 60 automatically selecting the corresponding sensing segment 91, the dimming processor may also dynamically adjust the dimmed transmissivity level and/or the rate of dimming speed of the dimmable sections 120 according to the lumen level sensed by the associated sensing segment(s).

Although typically most mobile (e.g., vehicular) implementations of DPCS may be expected to utilize light-sensing device 90, 92 with a requirement to detect sun glare within a radius area spanning −90 degrees to +90 degrees relative to a driver's forward position and perspective, there is no limitation, however, in the system using a light-sensing device 90, 92 capable of a full 360-degree radius as well. While the exemplary light-sensing devices 90, 92 of FIGS. 9A-9C utilized (36) segments that covered 10 degrees each, there is no limitation as to the use of a greater or smaller number of segments as part of the light-sensing device 90, 92 with each segment 91 then possessing a corresponding smaller or larger visual spatial coverage area ability. Further, the individual segments 91 need not cover the same number of degrees.

Referring to FIG. 9B, a light-sensing device 91 that contains multiple separate segments 91 that each contain both light sensors 84 and color sensors 95 is shown.

Referring now to FIG. 9C, a further embodiment of a light-sensing device 92 that utilizes light sensors 83 that each contained a segmented light sensor field 87 is shown. As discussed above, each segmented light sensor 83 typically includes a plurality of separate light-sensing segment areas 88 with the corresponding segment outputs from each light-sensing segment area 88 being transmitted to the dimming controller 60. The light-sensing segment areas 88 may be arranged in a horizontal/vertical grid (as presented above), a horizontal array, a vertical array, an arc, or any other arrangement as desired. The number of co-located light-sensing segment areas 88 for each segmented light sensor 83 can range in number depending on need. By utilizing such light sensor(s) 83 within the sensing device 92 and simultaneously sending to the dimming controller 60 both horizontal as well as vertical positioning differentiation, this allows the dimming controller 60 additional resolution to select and activate the optimum panel or dimmable substrate section(s) 120 for dimming.

Operatively, for the light-sensing devices 90, 92 the dimming controller 60 may continually (e.g., real-time) analyze the overall or averaged sensed lumen level from every operatively connected light sensor 83, 84 and/or every light-sensing segment area 88 to establish a "base" ambient light level. If one or more light sensors 83, 84 or light-sensing segment areas 88 exceeded the base level by a preset amount, the dimming controller 60 would trigger the dimmable substrate sections(s) 120 for dimming. Any section that had been triggered for dimming would continue to be monitored until the dimmed light level from that dimmed section(s) fell below a preset value (which indicated a reduced delta between it and the "base" ambient level) at which time that section's dimming would be reduced. The controller 60 would also be capable of controlling the spanning of adjacent horizontal and/or vertical dimmable sections should the incoming glare conditions require it.

An optional light-sensing device embodiment location would utilize a roof mounted device enclosure. The light-sensing device 90, 92 containing one or more light sensors 83, 84 would typically be housed in a weatherproof "bump" along the forward roofline area. The lateral roof mounting location may be determined by whether a vehicle was operatively configured for either left or right-hand drive. In either case, the "bump" enclosed light-sensing device may be placed roughly above the steering wheel location of the subject vehicle, which would be on the left side for left-hand drive countries/areas, and on the right side for right-hand drive areas/countries in order to properly capture the appropriate relative angular information for oncoming glare activity. In order for DPCS to compensate for any parallax error due to varying driver's heights, seating positions, and other factors, a driver would be provided with an up/down as well as a side to side parallax bias adjustment capability in order to match the effective boresight of the driver with the effective boresight of a light sensing device(s) (or other optical sensor(s)) operatively connected to a video processor in order to better align the system's perspective with a driver's perspective. This calibration, which would be applicable in any of the aforementioned modes, would also be able to be stored as a part of a driver "preset" macro along with the usual other adjustments or settings for later recall either manually (such as by selecting a "driver number") or the system recalling the calibration information automatically by the vehicle recognizing a particular key fob or other input that corresponds to a particular driver.

Figure 10A:
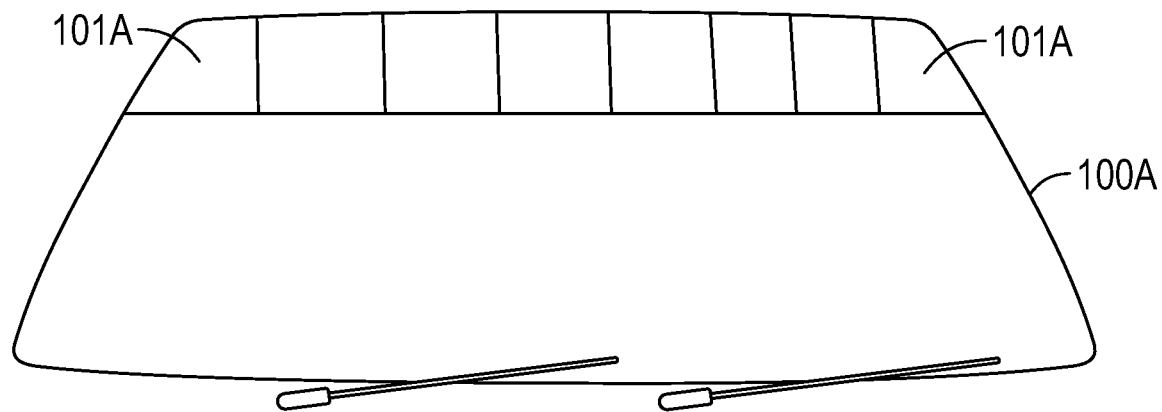
FIG. 10A shows a vehicle windshield substrate equipped with multiple simultaneous active dimming capable areas in accordance with the present disclosure.
Figure 10B:
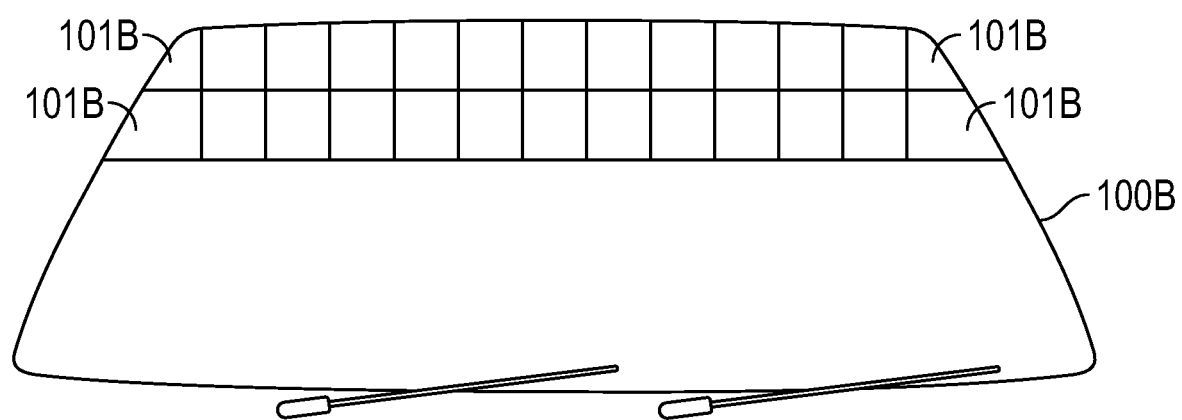
FIG. 10B shows another vehicle windshield substrate equipped with several multiple simultaneous active dimming capable areas in the top half of the substrate in accordance with the present disclosure.
Figure 10C:
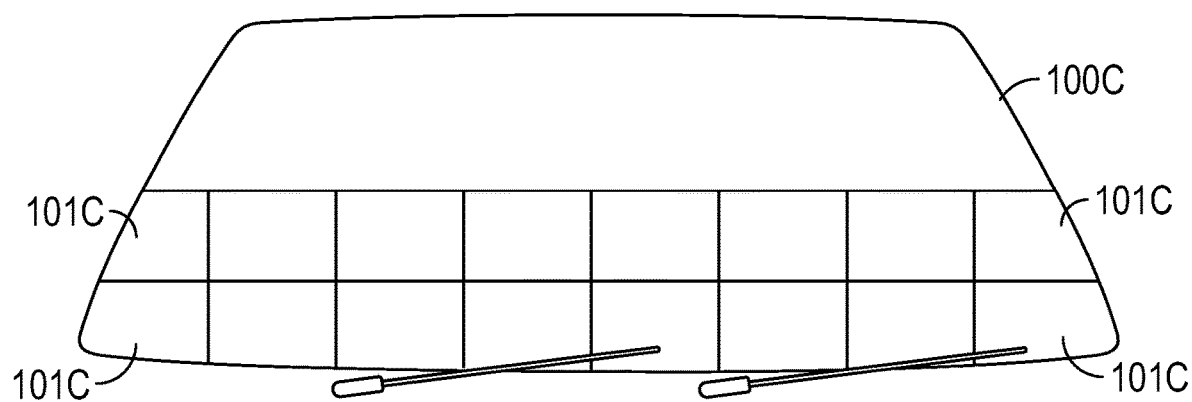
FIG. 10C shows another vehicle windshield substrate equipped with several multiple simultaneous active dimming capable areas in the bottom half of the substrate in accordance with the present disclosure.
Figure 10D:
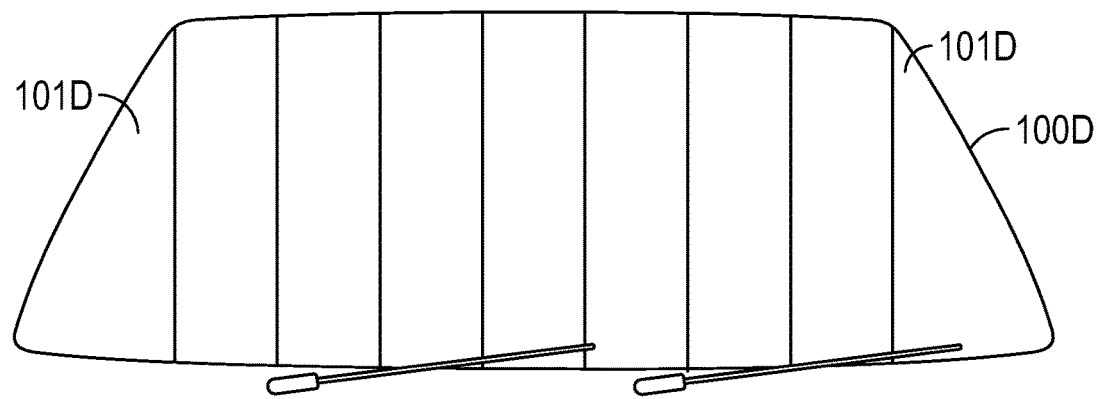
FIG. 10D shows another vehicle windshield substrate equipped with several multiple simultaneous active dimming capable areas oriented in a vertical direction in accordance with the present disclosure.

Referring now to FIGS. 10A-10D, various configurations of dimmable substrate section(s) 120 of an exemplary dimmable substrate 110 are shown. For these figures, the dimmable substrate 110 is illustrated as an automotive windshield substrate 100 and the dimmable substrate section(s) 120 are illustrated as dimmable delimited areas 101. Four example layouts are schematically shown in FIGS. 10A-10D to more clearly illustrate the concept of dividing a normally "all or none" dimmable substrate 110 into individually addressable and controllable specific dimmable delimited areas 101. In general, these dimmable delimited areas 101 may be evenly spaced or may have uneven spacing, for example, the dimmable delimited areas 101 may have a finer spacing in a region closer to the driver. Further, these dimmable delimited areas 101 may have equal or approximately equal areas or some of the dimmable delimited areas 101 may be smaller or larger than others. FIG. 10A shows a windshield substrate 100A having a single horizontal controllable array of dimmable delimited areas 101A positioned at or near the top edge of the windshield substrate 100A. FIG. 10B shows a windshield substrate 100B having a double-stacked horizontal controllable array of dimmable delimited areas 101B positioned at or near the top edge of the windshield substrate 100B. FIG. 10C shows a different double-stacked horizontal controllable area 101C of an automotive windshield 100C. In this embodiment, the double-stacked horizontal controllable array of dimmable delimited areas 101C is positioned at or near the bottom edge of the windshield substrate 100C. Here the lowermost horizontal array of areas 101C is thinner than row above it. FIG. 10D shows an array of vertically-segmented controllable dimmable delimited areas 101D of an automotive windshield 100D. These dimmable delimited areas 101D are shown as extending from the top of the windshield 100D to the bottom of the windshield. For any of the above embodiments, any of the dimmable delimited areas 101 may be independently controlled relative to the other dimmable delimited areas 101.

Referring to FIGS. 11A-11C, an exemplary relationship between a DPCS light sensor and the dimmable substrate section(s) of a dimmable substrate 110 is schematically shown. For these figures, the dimmable substrate 110 is illustrated as an automotive windshield substrate and the dimmable substrate section(s) are illustrated as dimmable delimited areas 120A-120D. Additionally, for these figures, an exemplary DPCS light sensor is illustrated as a multi-section light sensor 83A including light-sensing segment areas 88A-88D. FIG. 11A shows a side profile of a dimmable substrate 110 with an upper dimmable delimited area 120A and a lower dimmable delimited area 120B. FIG. 11A also shows a side profile of a segmented light sensor field 87 of a multi-section light sensor 83A including light-sensing segment areas 88A, 88B. The dimmable delimited areas of the dimmable substrate 110 are operatively matched to the light-sensing segment areas 88A-88D. FIG. 11B shows a front view of the light sensor 83A revealing two additional light-sensing segment areas 88C, 88D. Light-sensing segment area 88D is shown to have sun glare 89 shining upon it. FIG. 11C shows exemplary windshield 100 that possesses dimmable delimited areas 120A-120D. The sun glare 89 is shown at section 120D of the windshield which corresponds to section 88D of the light sensor.

In a further embodiment of the DPCS, actively dimmed areas of dimmable substrates would allow for active image area(s) to be coordinated between image processor 10 and dimming controller 60 to dynamically link the location of one or more actively dimmed areas with active images. This would allow the dimmable substrate to generate a display back-side privacy shield. Such a display back-side privacy shield would automatically follow the size and location of any active display area. Further, a background dimming size offset adjustment generated and controlled by the dimming controller 60 would allow a dimmed background to be larger than the size of the image 15 if desired. Such an enlarged dimmed background would better shield the display area from incoming light, provide additional privacy shielding, provide better contrast for the image 15 to be viewed by a user, or for other needs.

Figure 12:
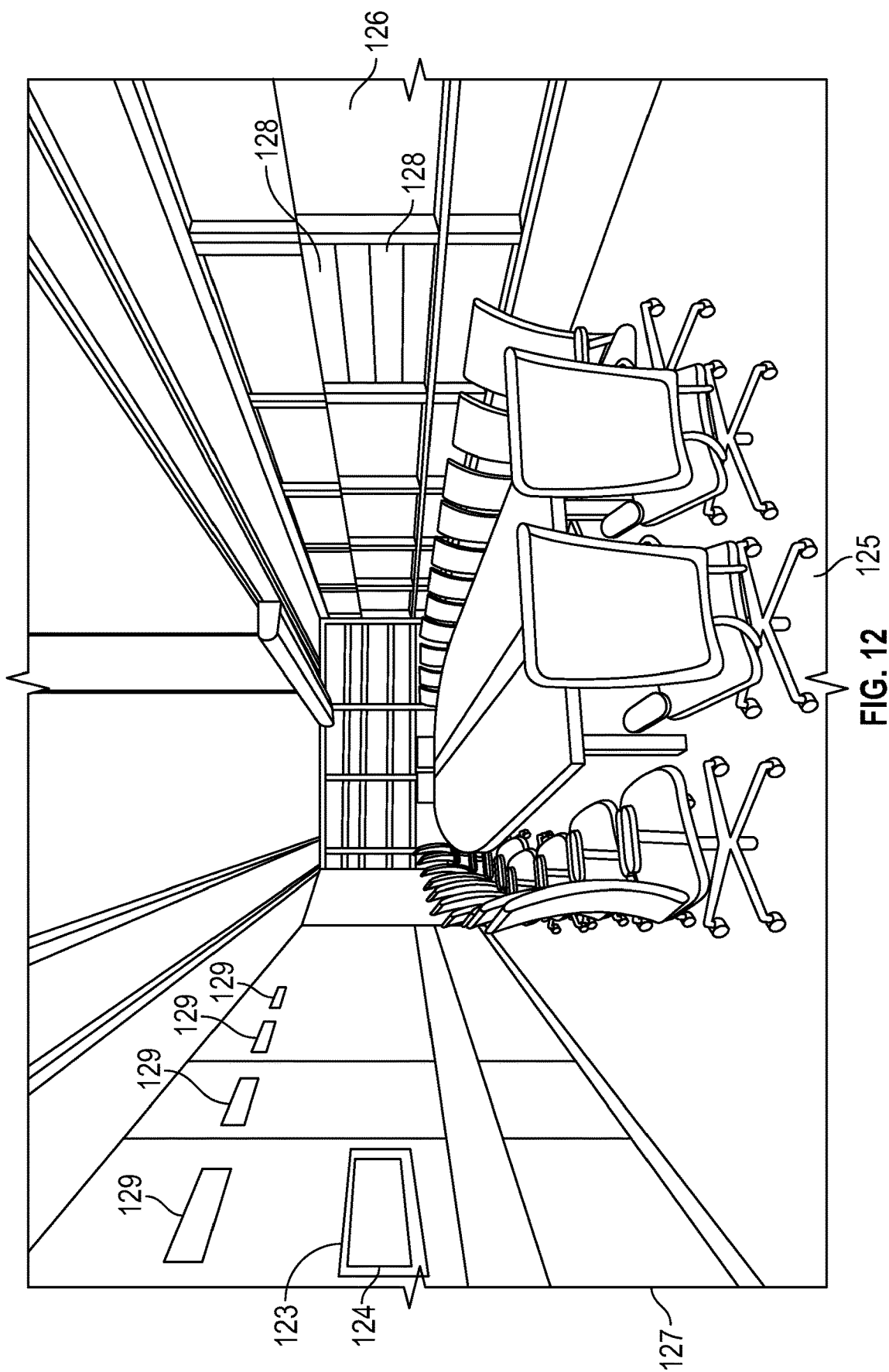
FIG. 12 shows an office conference room with glass exterior windows with electrochromic dimming and glass partition walls with generated image surrounded by privacy shield and room lighting in accordance with the present disclosure.

Referring to FIG. 12, an exemplary office conference room 125 with glass exterior windows 126 with selective electrochromic dimming segments 128 and glass partition walls 127 with generated image 124 surrounded by privacy shield 123 and room lighting 129 is shown. In this embodiment, a dimmed backside is used with an active area to keep the active illumination pixels visibly confined to the primary side of the display to provide for display privacy when used in interior transparent wall areas of, for instance, a conference room where the walls can also be used to both dim as well as display images, etc. either independently or simultaneously. In the case of images displayed on glass exterior windows, a dimmed backside of displayed images would provide for easier viewing and contrast. In the case of an exterior wall embodiment, the use of generated text or other information could add "augmented reality" while viewing the exterior. This embodiment would be especially useful in locations such as an airport control tower where the aircraft flight number and other information could be presented in a manner similar to how an aircraft's transponder information is displayed adjacent to a radar return echo.

In another exemplary embodiment of controlling active display elements within a glass or plastic substrate, those areas containing display elements may also be configured and used in a special mode to provide supplemental or general room interior illumination purposes by having all of the selected pixels within a desired active display area illuminate monochromatically at both a chosen color temperature as well as at a selected intensity level. This arrangement may be used in either mobile or fixed building applications where multiple simultaneous illumination display areas may also be generated and used in each window-pane or section, if desired, to further modulate the level of produced light to supplement or act as a primary light source for general room area lighting or dimming.

Even further, display and dimming layers may be combined within the same overall substrate layer or placed on the inside or outside surface of a base glass or plastic substrate. The "inside" or "outside" layers may be permanently "sandwiched" together, fused together, or pressed together or optionally moved into alignment by motorized means as needed. In the case of vehicular windshields, a layer of plastic laminate is normally used to inherently prevent a sheet of glass from separating after shattering and that layer may additionally and simultaneously serve to be used for dimming and/or display purposes.

Figure 13A:
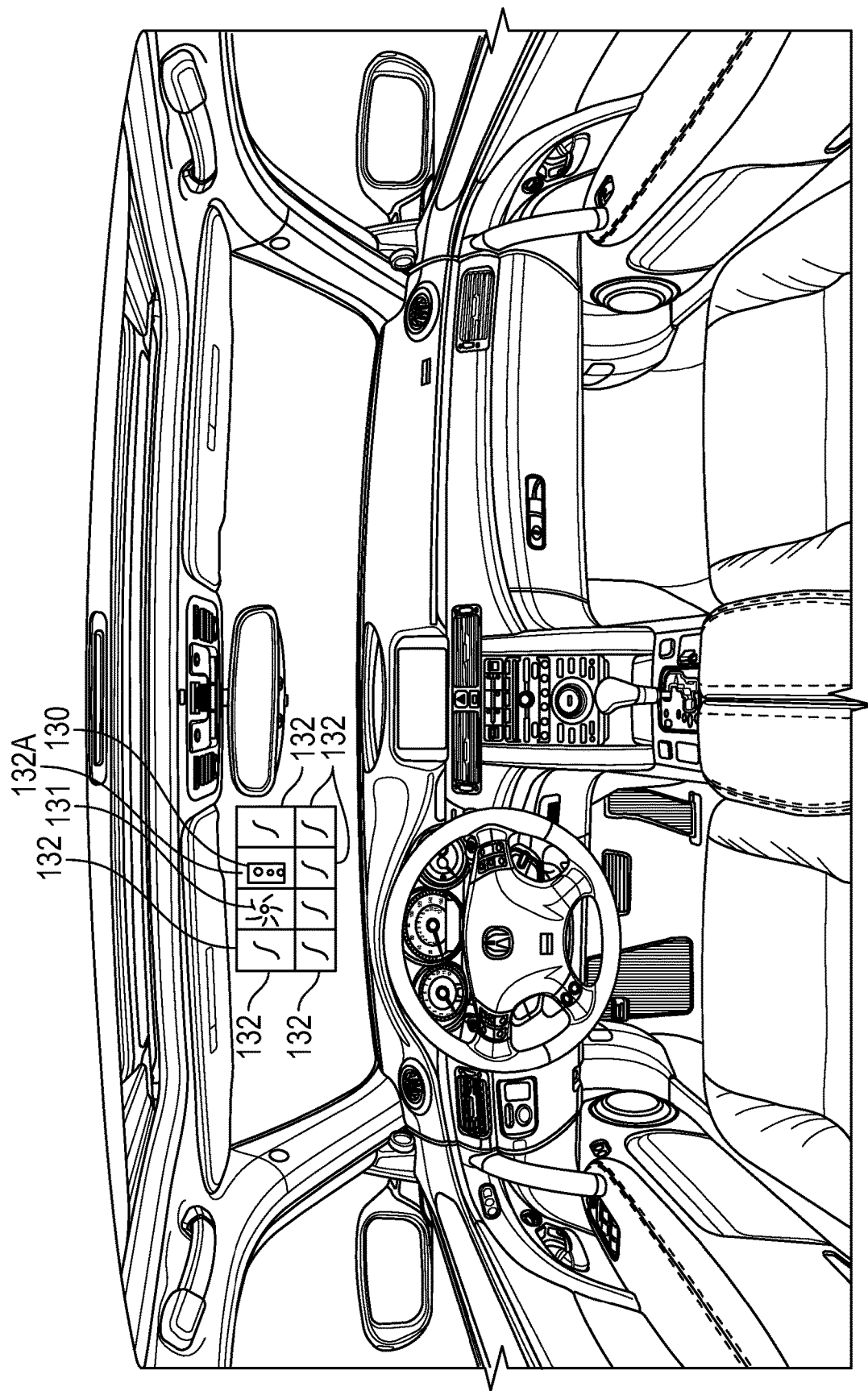
FIG. 13A shows an interior view of an automobile that is receiving sun glare in conflict with a traffic signal in accordance with the present disclosure.
Figure 13B:
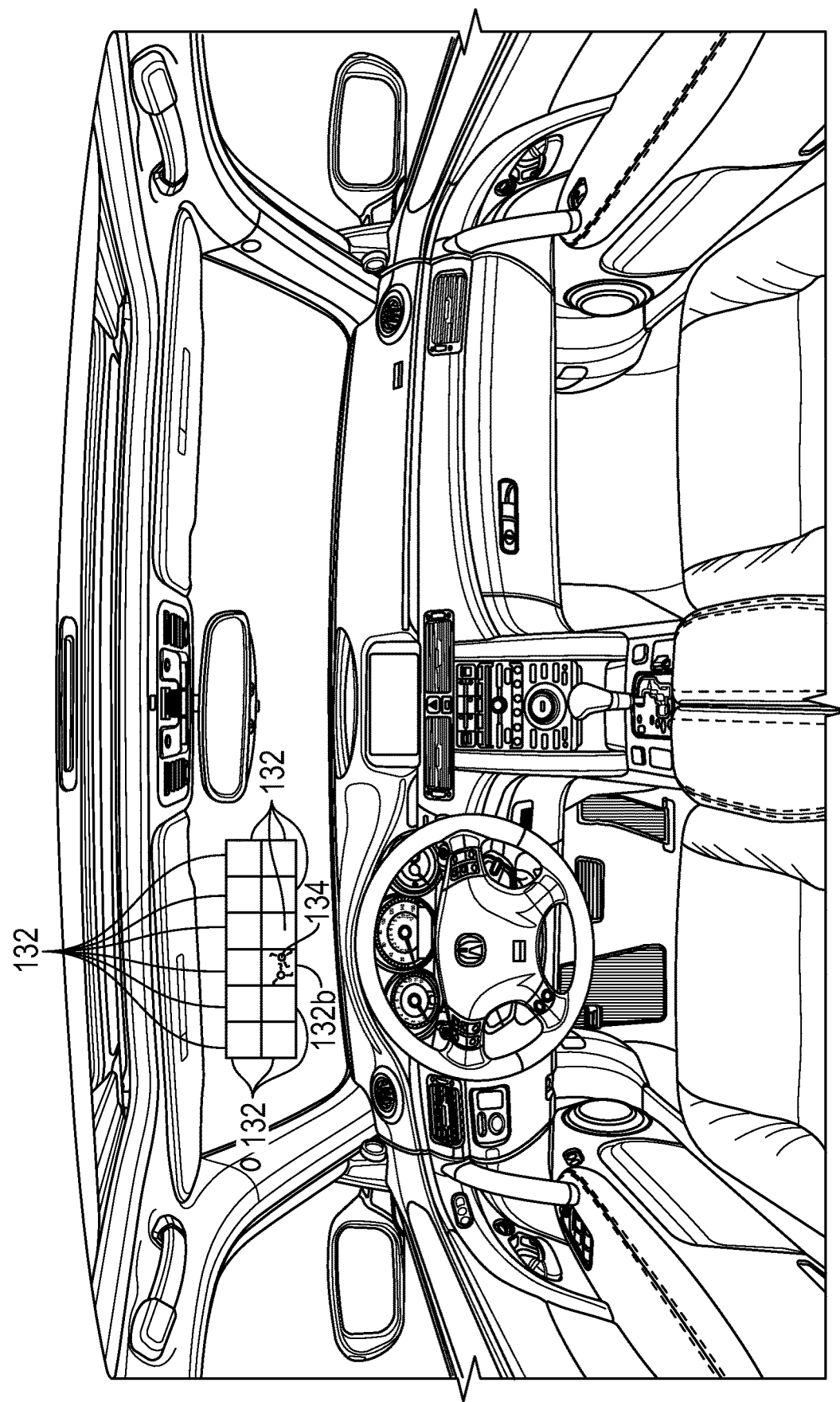
FIG. 13B shows an interior view of an automobile that is receiving oncoming headlight glare in accordance with the present disclosure.

Referring now to FIGS. 13A and 13B, interior views of an automobile that is receiving glare (e.g., sun glare or headlight) is shown. The vehicle is shown equipped with DPCS sectional dimmable panels 132. In FIG. 13A, the driver is faced with a situation wherein the perceived spatial location of incoming sunlight glare 131 is aligned with the perceived spatial location of a traffic signal 130. This could occur especially near sunset when a driver's pupils typically have started to widen which increases the contrast between the light level of a traffic signal and the light level of sunlight. In such instance, a driver is faced with either struggling to see the status of the traffic signal over the glare or manually using a sun visor to try and block the sun glare which unfortunately also results in their inability to see the traffic signal. In order to properly mitigate sun glare 131 that appears in an area of the windshield proximate to the location in which both a traffic signal 130 as well as sun glare 131 appear together, care must be taken by DPCS to limit the amount of automatic dimming to a level that is just short of the point where further dimming would prevent a driver from being able to see and interpret the traffic signal. In this situation, DPCS would operate with up to two special "traffic signal" modes to provide glare reduction for the vehicle driver while simultaneously maintaining the ability of that driver to still maintain an ability to see the traffic signal.

In a first "special" traffic signal mode, in addition to the use of light-sensing device 84 to detect the presence of an unusually bright area in one or more vehicle window locations, one or more color sensor(s) 95 would additionally be used in a similar locational sensing manner as the light-sensing device 84 in order to provide concurrent Red/Yellow/Green light sensing coverage of the upper area(s) of a front windshield (i.e., the area which a driver would typically utilize to see traffic signals during normal vehicular operation). Such concurrent light and color sensors are schematically shown in FIG. 9B. Both the general photosensors of the light-sensing device 84 as well as the color sensors 95 would be operatively linked and connected to an advanced version of a DPCS dimming controller 60 which would dynamically sense the concurrent presence of "standardized" Red/Yellow/Green light from traffic signals as well as sun glare as seen through one or more monitored upper windshield segment(s) that are typically used to see traffic signals at close range. Upon the DPCS dimming controller 60 sensing an area of above threshold brightness while also sensing a concurrent Red/Yellow/Green light, the dimming processor would limit the maximum dimming of those segments 132A that are sensing primary colors Red/Yellow/Green light to a preset limit point. This preset point may be determined by the color sensor's reactive response to the diminishing resultant perception level of the Red/Yellow/Green light reaching a certain point of color ascertainment that would roughly correspond to the ability of the human eye to discern the presence of the Red/Yellow/Green light being emitted by the traffic signal. In this manner, the ability of a human driver or autonomous vehicle to directly sense the traffic signal light's color is at the optimum balance point between sun glare diminishment and color discernment ability. With a vehicle equipped with DPCS, the traditional "tinted" upper windshield would no longer be necessary thus allowing the vehicle to facilitate an easier color determination of a traffic signal by a driver.

In a second "special" traffic signal mode, a special color sensor 95 and/or a segmented light sensor 83 may be used to further supply the DPCS processor with an enhanced X/Y positional discernment of both the sun glare location 131 as well as an enhanced X/Y positional discernment of Red/Yellow/Green light 130. This enhancement would allow the generation of a specific sized and centered "cutout" or "keyhole" function that would dynamically prevent dimming of just the one or more dimmable panel areas 132A that are exhibiting Red/Yellow/Green colors while allowing for full dimming of the surrounding sectional area(s) 132 (to the traffic signal).

Referring to FIG. 13B, an interior view of an automobile that is receiving oncoming headlight glare 134 is shown. Similar to the embodiment of FIG. 13A, the vehicle is equipped with DPCS dimmable sectional areas 132. However, in the embodiment of the DPCS shown in FIG. 13B, the operational control of the DPCS is reversed from the just described second "traffic signal" mode. Specifically, in a vehicle headlight sensing system embodiment, control is provided for only spot-area dimming of oncoming headlights 134. Thus, in this embodiment, specific area dimming would take place just for just the one or more sections 132B of the windshield in front of a driver which corresponded to oncoming vehicular headlights 134 above a preset lumen level. The dimming controller 60 would automatically and dynamically dim only the appropriate area(s) 132B of the windshield corresponding to the perceived location of the oncoming headlights. An interior driver's "point of view" multi-segment light sensor(s) 83 that is operatively connected to the dimming processor 60 would dynamically determine the appropriate segment location(s) and size of the appropriate windshield panel segment or segments 132 that needed to be dimmed. This embodiment, instead of generally dimming entire panel areas would instead only dynamically dim just those subsections of dimmable panels or substrates 132 that were necessary to block and dynamically track the location of any offending headlights without needlessly dimming unneeded areas in the process.

In an additional embodiment, the DPCS headlight mode may have user defined sensitivity adjustment capability. This would allow a user to select a contrast level between the general outside ambient light level and oncoming headlights. Optionally, this function may be automatically activated by an overall ambient light-level sensor to provide a preset contrast range activation of this mode.

As some embodiments of fully autonomous vehicles allow for the elimination of a steering wheel (and the required forward front-seat for a driver), this configuration allows added design flexibility for the use of non-traditional seating arrangements such as rearward-facing and/or sideways-facing front seating layouts. In such cases, the use of adjacent glass areas for display, overall glare reduction, and/or privacy dimming is advantageous.

For example, one of the recognized downsides with the use of rearward facing seating is that for some individuals such seating causes motion sickness due to conflicts between a body's inner-ear motion detection and contradictory visual cues. To counter this, external video camera(s) can feed video displays that may be built into and a part of a vehicle to provide alternate views (such as from a rearward-facing camera) that would provide images more in line with the expected visual cues relative to the inner ear motion sensing in order to combat nausea. By providing these views simultaneously with full window area dimming, there would be no conflicts between the alternate visual cues that are being displayed and what the natural outside view would show.

While DPCS has been described in many fixed and automotive embodiments so far, there are additional non-automotive or fixed area embodiments that would greatly benefit from this technology. The first additional embodiment would provide for improvements to auto-dimming welding helmets. While the introduction of automatic dimming welder's helmets years ago greatly benefited the work of welders, allowing the welders to see and set up the work area without any helmet visor dimming until the point of actual arc production, once the auto-darkening system engaged welders are still in the same situation they faced before the auto-dimming technology came about in that the only areas they are able to see during active welding is still limited to that small area immediately adjacent to an arc itself. With DPCS, unlike the present auto-dimming of the complete viewing window, just the most intense luminous area(s) that are immediately adjacent to the arc would be auto-dimmed, with any other area(s) that present with less than a preset amount of luminosity would remain brighter or undimmed. This provides a welder with an improved perspective of their immediate work area that is unobtainable by present means.

Unlike the current "off/on" dimming of the entire welder's viewing window, DPCS divides the viewing window into multiple areas, with the size of each area proportional to the number of segments the viewing window is divided into. As an example, a "typical" 4"×3" viewing window, instead of darkening the complete viewing area can instead be divided into separate and independent acting one-half inch square viewing areas. Thus a 3"×4" area would contain six separate "windows across by eight separate windows down in a matrix pattern. The number of independent areas of the viewing area may be increased or decreased as needed, recognizing that as the number of separate individual window areas increases, the granularity of the individual viewing area also increases proportionally.

With respect to the auto-dimming welding helmets, as the number of separate dimming sections within a total visor area increases, the number of adjacent non-dimming or partially dimmed areas also increases thus allowing a higher degree of visible work area that is increasingly close to the arc producing area(s) without the need for full or partial dimming of those adjacent areas. As mentioned with previous embodiments, each area's dimming requirement is independent and dynamically controlled by a light sensor intended for each dimmable section which allows an independent and dynamic luminosity determination to be made as to whether dimming in a particular section only is needed or a more general dimming is needed. As the primary area of welding changes and/or the welder's head swings left or right and/or up or down, DPCS tracks and controls in real time the appropriate viewing segment(s) protection that is needed. In some embodiments, given the speed of instantaneous dimming needed, the system may initially dim all segments before returning the unneeded dimmed segments to a non-dimmed status.

Another embodiment similar in principle to the oncoming headlight embodiment previously described, may be used in the aviation industry to counteract the increasing numbers of incidents wherein ground based hand-held lasers are purposefully and maliciously made to shine into the cockpit windows of civilian airplanes in flight, especially during the critical landing phases. Similarly, there is increasingly deliberate military use of military grade "pilot-blinding" lasers directed toward enemy military aircraft in combat situations. While electrochromic dimming has been previously used to mitigate this situation by overall dimming of a pilot's helmet visor as well as dimming entire aircraft windshields, this often turns out to be a case of "the cure becomes worse than the problem" as any unneeded or extended loss of vision during critical flight operations may be extremely detrimental. By utilizing DPCS's dynamic independently dimmable multi-segment approach, the complete and extended loss of a pilot's vision during deliberate blinding attempts is dynamically minimized as with the headlight glare mitigation the dimming countermeasures are limited to just those areas that are in the perceived boresight of the laser emissions, thus preserving a pilot's situation awareness while simultaneously offering blindness protection.

While the prior discussion centered on aircraft usage, DPCS may be used with other vehicles such as trucks, trains, etc.

Figure 14:
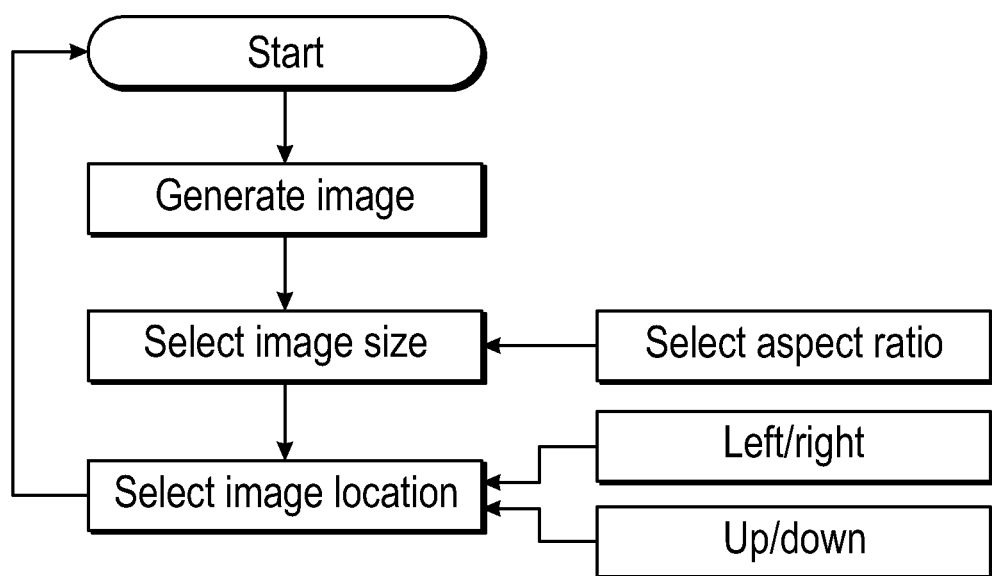
FIG. 14 shows a flow chart of an exemplary algorithm for dynamic image generation and/or location in accordance with the present disclosure.
Figure 15:
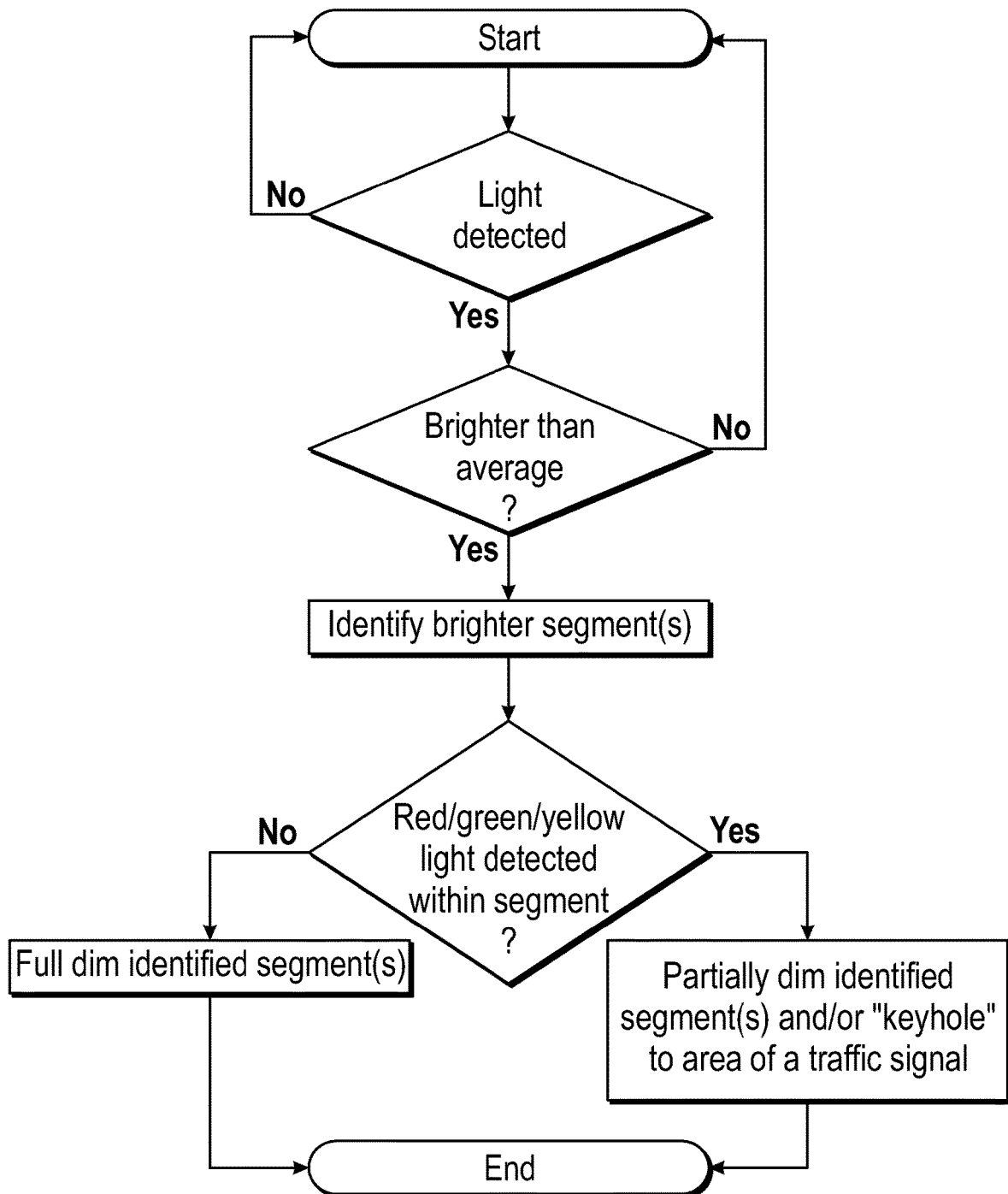
FIG. 15 shows a flow chart of an exemplary algorithm for an automatic selective dimming process in accordance with the present disclosure.
Figure 16:
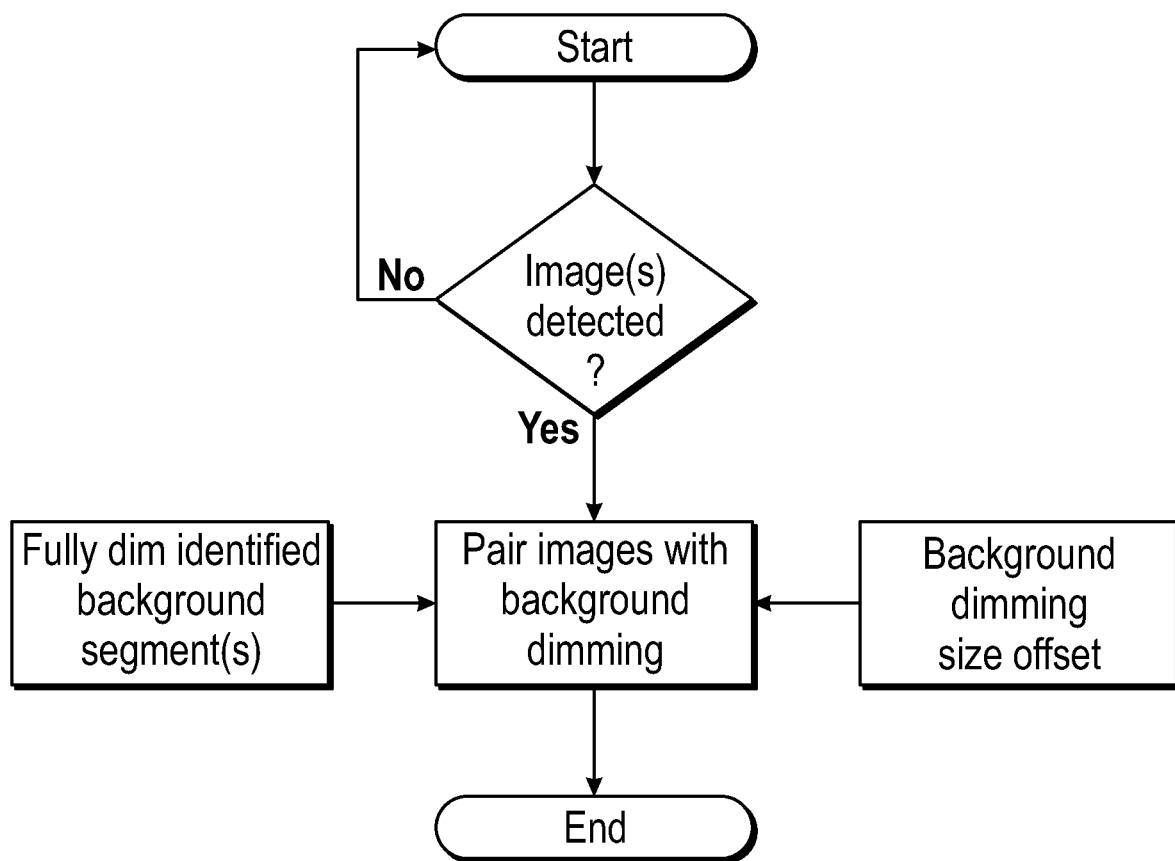
FIG. 16 shows a flow chart of an exemplary algorithm for a linked image and/or dimming process in accordance with the present disclosure.

FIGS. 14-16 provide flow charts for certain control algorithms associated with the operation of the dynamic positioning control system. FIG. 14 documents an exemplary algorithm for dynamic image generation and/or location. First, an image is generated. After the image is generated, an image size is selected (which may include receiving input as to a selected aspect ratio). Next an image location is selected, which includes receiving input as to a selected left/right position (or relative position) and as to a selected up/down position (or relative position). The process repeats should another image be generated. FIG. 15 documents an exemplary algorithm for an automatic selective dimming process. In this automatic selective dimming process, the system determines if light is detected. If light is detected, the algorithm queries whether the detected light is brighter than average. If the detected light is not brighter than average, the algorithm loops back to the top. If the detected light is brighter than average, the DPCS identifies which dimming-capable segment areas are brighter than average. Assuming that a color sensor is also used, the DPCS then determines is red/green/yellow light is detected within the segment area that was identified as being brighter than average. If the color sensor does not detect red/green/yellow light, then the DPCS algorithm generates a signal to full dim the segments identified as being brighter than average. If the color sensor does detect red/green/yellow light, then the DPCS algorithm generates a signal to partially dim the segments identified as being brighter than average and having the detected red/green/yellow light in order to "keyhole" the area(s) corresponding to the traffic signal. FIG. 16 documents an exemplary algorithm for a linked image and/or dimming process. In a first step, the system queries whether one or more images are detected. If an image is detected, the DPCS pairs the image(s) with background dimming based on a determination of whether identified background segment area(s) should be full dimmed and/or whether a background dimming size adjustment is appropriate. While the image processor and dimming controller have generally been shown and described as being separate elements, it is within the scope of the present disclosure for the functions of the image processor and dimming controller to be performed by a single controller element.

In general, in order to minimize any adverse visual distortion of a substrate that is capable of generating a visible display and/or capable of dimming, various dimming element control methods may be used. Among such methods that are contemplated is the use of extremely fine control wires (e.g., AWG 40 which has a 0.0031 inch diameter) that would operatively connect each image generation element or dimming section to the image processor's output. Such wires may be embedded or molded into a non-conductive substrate, so there would be no need for insulated or enameled wire which would add to the thickness of the wire itself. Thus, the resulting wire connections would be so fine that they would not be noticed at a normal viewing distance in the substrate. Just as a bit of dirt or other object on a windshield is not "seen" or noticed by a driver due to depth of field considerations, the tiny control wires would similarly not disrupt a driver's vision. Since the amount of current needed to control and power each segment's control element is extremely low, the small wire size may be used for both of these functions. Other control and powering embodiment methods may include the use of microscopic "channels" etched into a substrate layer which may then be backfilled with conductive paint, etc. Wires for controlling image generating elements or dimming section(s) may be directly run to individual elements, or addressed through the use of multiplexed addressing, strobe addressing, or other addressing methods in common use. In the case of supplying operating power to the individual control or image-generating elements, power leads may be terminated at common termination point(s) or at power buses outside of the visible substrate area.

The foregoing description of embodiments of the present disclosure has been presented for the purpose of illustration and description. It is not intended to be exhaustive or to limit the invention to the form disclosed. While the exemplary application has focused on particular embodiments, obvious modifications and variations are possible in light of the above disclosure and should be considered to be within the scope and spirit of the present disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A dynamic positioning control system comprising:
   a transparent or semi-transparent substrate;
   a dimming controller;
   a plurality of electrodes operatively connected to the dimming controller configured to dim one or more areas on or within the substrate within an overall electrochromic dimming-capable field area; and
   a color sensor operatively connected to the dimming controller;
   wherein the dimming controller is configured to not allow a transmissivity level of the dimmed one or more areas to fall below a predetermined threshold when the dimming controller determines a presence of a traffic light signal; and
   wherein the dimming controller is configured to determine the presence of the traffic light signal based only on when a color is detected by the color sensor indicative of a traffic light signal.

2. The dynamic positioning control system according to claim 1, wherein the plurality of electrodes operatively connected to the dimming controller configured to dim a plurality of the one or more areas on or within the substrate within the overall electrochromic dimming-capable field area.

3. The dynamic positioning control system according to claim 1, wherein the dimming controller is configured to cause the plurality of electrodes to move a position of the one or more dimmed areas vertically and/or horizontally relative to the overall electrochromic dimming-capable field area.

4. The dynamic positioning control system according to claim 3, further comprising an input device operatively connected to the dimming controller, wherein the dimming controller is configured to cause the plurality of electrodes to move the position of each of the one or more dimmed areas vertically and/or horizontally relative to the overall electrochromic dimming-capable field area based on an input received by the input device from a user.

5. The dynamic positioning control system according to claim 1, wherein the plurality of electrodes are configured to dim the one or more areas to a plurality of different transmissivity levels.

6. The dynamic positioning control system according to claim 5, further comprising at least one light sensing device operatively connected to the dimming controller, wherein the diming controller is configured to cause the plurality of electrodes to dim the one or more selective areas to a particular transmissivity level of plurality of different transmissivity levels based on a detected light angle and/or detected light magnitude detected by the light sensing device.

7. The dynamic positioning control system according to claim 6, wherein the at least one light sensing device comprises a radially arranged multi-sector segmented light level sensing device.

8. The dynamic positioning control system according to claim 7, wherein each angular segment of the at least one light sensing device contains two or more light sensors.

9. The dynamic positioning control system according to claim 8, wherein each light sensor of the two or more light sensors having a different vertical offset angle from any other light sensors of the two or more light sensors arranged within that respective angular segment.

10. The dynamic positioning control system according to claim 6, wherein the at least one light sensing device comprises a radially arranged multi-sector segmented light level sensing device, with each angular segment within the light level sensing device containing one or more light sensors and one or more color sensors.

11. The dynamic positioning control system according to claim 10, wherein each light sensor segment has a different vertical and/or horizontal offset angle from any other light sensor(s) arranged within that respective segment area, and each color sensor segment has a different vertical and/or horizontal offset angle from each other color sensor(s) arranged within that respective segment area.

12. The dynamic positioning control system according to claim 1, further comprising at least one multi-segment light sensing device operatively connected to the dimming controller, wherein the diming controller is configured to cause the plurality of electrodes to dim the one or more areas to a particular transmissivity level of plurality of different transmissivity levels based on a detected light angle and/or detected light magnitude detected by the multi-segment light sensing device;
wherein the multi-segment light sensing device comprises four or more independent sub-sensor areas, with each sub-sensor area being operatively connected to the dimming controller; and
wherein the dimming controller is configured to compare a lumen level of detected by each sub-sensor area and determine if one or more sub-sensor areas is receiving a higher lumen level than the other sub-sensor areas and cause the plurality of electrodes to dim a particular area of the one or more areas corresponding to the sub-sensor area receiving the higher lumen level.

13. The dynamic positioning control system according to claim 1, wherein the transparent or semi-transparent substrate is at least part of a window or a windshield of an autonomous vehicle.

14. The dynamic positioning control system according to claim 1, wherein the transparent or semi-transparent substrate is at least part of a side window of a vehicle.

15. The dynamic positioning control system according to claim 1, wherein the transparent or semi-transparent substrate is at least part of a window or a windshield of a vehicle, and wherein the color sensor is mounted on a roof of the vehicle.

16. The dynamic positioning control system according to claim 1, further comprising:
wherein the plurality of electrodes are configured to dim one or more additional areas on or within the substrate;
wherein the one or more additional areas are adjacent to the one or more areas; and
wherein the dimming controller is configured to allow a transmissivity level of the one or more additional areas to fall below the predetermined threshold while the dimming controller controls the plurality of electrodes to not allow the transmissivity level of the one or more areas to fall below the predetermined threshold.

17. A dynamic positioning control system comprising:
a transparent or semi-transparent substrate;
an image processor;
one or more image-generating elements operatively connected to the image processor configured to simultaneously generate one or more images within an overall image-generating-capable field area of the substrate;
a dimming controller; and
a plurality of electrodes operatively connected to the dimming controller configured to dim one or more areas on or within the substrate within an overall electrochromic dimming-capable field area;
wherein the image processor and the dimming controller are separate elements or are a single controller; and
wherein the dimming controller is configured to automatically cause the plurality of electrodes to dim a particular area of the one or more areas depending on a position of the one or more images thereby obscuring the one or more images from view on a first side of the substrate and not obscuring the one or more images from view on a second side of the substrate.

18. The dynamic positioning control system according to claim 17, wherein the dimmed one or more areas are configured to obscure the one or more images from view on a first side of the substrate and not obscure the one or more images from view on a second side of the substrate.

19. The dynamic positioning control system according to claim 17, wherein the plurality of electrodes are configured to dim one or more segment areas to a plurality of different transmissivity levels.

20. The dynamic positioning control system according to claim 19, further comprising an input device operatively connected to the dimming controller, wherein the dimming controller is configured to cause the plurality of electrodes to dim the one or more segment areas to a selected transmissivity level of the one or more transmissivity levels based on an input received by the input device from a user.

21. The dynamic positioning control system according to claim 17, wherein the image processor is configured to cause the one or more image-generating elements to move a position of each of the one or more images vertically and/or horizontally relative to the overall image-generating-capable field area.

22. The dynamic positioning control system according to claim 17, wherein, when the one or more images are moved from a first position to a second position, the dimming controller is configured to automatically cause the plurality of electrodes to stop dimming an area of the substrate corresponding to the first position thereby increasing the transmissivity level of the substrate at the first position.

23. A vehicle comprising the dynamic positioning control system according to claim 17.

24. The vehicle according to claim 23, wherein the transparent or semi-transparent substrate is a front windshield and/or side window of the vehicle.

25. The dynamic positioning control system according to claim 17, wherein the transparent or semi-transparent substrate is at least part of a window or a windshield of an autonomous vehicle.

26. The dynamic positioning control system according to claim 17, wherein the transparent or semi-transparent substrate is at least part of a side window of an autonomous vehicle.

\* \* \* \* \*